(12) United States Patent
Jung et al.

(10) Patent No.: US 11,881,978 B2
(45) Date of Patent: Jan. 23, 2024

(54) APPARATUS AND METHOD FOR RECOVERY OF SYNCHRONIZATION IN WIRELESS COMMUNICATION SYSTEM

(71) Applicant: Samsung Electronics Co., Ltd., Suwon-si (KR)

(72) Inventors: Doyoung Jung, Suwon-si (KR); Sangkyou Ryou, Suwon-si (KR); Ingil Baek, Suwon-si (KR); Junhee Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/477,907

(22) Filed: Sep. 17, 2021

(65) Prior Publication Data

US 2022/0006681 A1 Jan. 6, 2022

Related U.S. Application Data

(63) Continuation of application No. 16/295,233, filed on Mar. 7, 2019, now Pat. No. 11,128,512.

(30) Foreign Application Priority Data

Mar. 7, 2018 (KR) .......................... 10-2018-0026971

(51) Int. Cl.
*H04W 24/10* (2009.01)
*H04W 72/044* (2023.01)
(Continued)

(52) U.S. Cl.
CPC ...... *H04L 27/2666* (2013.01); *H04L 27/2657* (2013.01); *H04W 24/10* (2013.01);
(Continued)

(58) Field of Classification Search
CPC .......................... H04W 24/10; H04W 72/042
(Continued)

(56) References Cited

U.S. PATENT DOCUMENTS

| 10,128,991 B2 | 11/2018 | Marinier et al. |
| 2011/0021154 A1 | 1/2011 | Marinier et al. |

(Continued)

FOREIGN PATENT DOCUMENTS

| CN | 102293037 A | 12/2011 |
| CN | 102308625 A | 1/2012 |

(Continued)

OTHER PUBLICATIONS

CATT; "Discussion on synchronization for carrier aggregation in V2X Phase 2"; 3GPP TSG RAN WG1 Meeting #92; Athens, Greece, Feb. 26-Mar. 2, 2018; R1-1801702.

(Continued)

*Primary Examiner* — Angel T Brockman
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to various embodiments of the disclosure, an apparatus of a terminal in a wireless communication system is provided. The apparatus includes at least one transceiver, and at least one processor configured to be operatively connected to the at least one transceiver, wherein the at least one processor may be configured to: obtain first synchronization of a first carrier that is in synchronization, determine second synchronization of a second carrier that is out of synchronization based on the first synchronization, and perform communication based on the second synchronization.

20 Claims, 17 Drawing Sheets

(51) Int. Cl.
*H04W 56/00* (2009.01)
*H04W 72/0453* (2023.01)
*H04L 27/26* (2006.01)
*H04B 7/0413* (2017.01)
*H04B 7/06* (2006.01)
*H04B 7/08* (2006.01)

(52) U.S. Cl.
CPC ....... *H04W 56/001* (2013.01); *H04W 72/046* (2013.01); *H04W 72/0453* (2013.01); *H04B 7/0413* (2013.01); *H04B 7/0617* (2013.01); *H04B 7/086* (2013.01)

(58) Field of Classification Search
USPC .......................................................... 370/329
See application file for complete search history.

(56) References Cited

U.S. PATENT DOCUMENTS

| | | |
|---|---|---|
| 2011/0292824 A1 | 12/2011 | Uemura et al. |
| 2012/0082152 A1 | 4/2012 | Baldemair et al. |
| 2012/0115468 A1 | 5/2012 | Lindoff et al. |
| 2014/0071861 A1 | 3/2014 | Sun et al. |
| 2014/0233396 A1 | 8/2014 | Marinier et al. |
| 2015/0004972 A1 | 1/2015 | Nielsen et al. |
| 2015/0223178 A1 | 8/2015 | Pietraski et al. |
| 2015/0245307 A1 | 8/2015 | Chen et al. |
| 2018/0007670 A1 | 1/2018 | Bala et al. |
| 2019/0280911 A1* | 9/2019 | Jung ................. H04W 72/0453 |
| 2021/0297961 A1 | 9/2021 | Park et al. |

FOREIGN PATENT DOCUMENTS

| | | |
|---|---|---|
| CN | 104113906 A | 10/2014 |
| CN | 104205947 A | 12/2014 |
| KR | 10-2015-0017003 A | 2/2015 |
| KR | 10-2018-0018391 A | 2/2018 |
| WO | 2017/177887 A1 | 10/2017 |

OTHER PUBLICATIONS

Huawei Hi Silicon; "NR Primary and Secondary Synchronization Signals Design"; 3GPP TSG RAN WG1 Meeting #87; Reno, USA, Nov. 14-18, 2016; R1-1611261.
International Search Report dated Jun. 19, 2019; International application No. PCT/KR2019/002662.
Extended European Search Report dated Mar. 24, 2021, issued in European Patent Application No. 19765089.8.
Korean Notice of Patent Grant dated Jan. 29, 2023, issued in Korean Patent Application No. 10-2018-0026971.
Extended European Search Report dated Sep. 15, 2023, issued in European Patent Application No. 23176763.3.
Chinese Office Action dated Oct. 19, 2023, issued in Chinese Patent Application No. 201980012855.7.

* cited by examiner

APPARATUS AND METHOD FOR RECOVERY OF SYNCHRONIZATION IN WIRELESS COMMUNICATION SYSTEM

CROSS-REFERENCE TO RELATED APPLICATION(S)

This application is a continuation application of prior application Ser. No. 16/295,233, filed on Mar. 7, 2019, which is based on and claims priority under 35 U.S.C. § 119(a) of a Korean patent application number 10-2018-0026971, filed on Mar. 7, 2018, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for recovering synchronization in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'post long term evolution (LTE) system'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To receive signals on resources in a wireless communication system, the terminal is required to acquire synchronization. If the terminal fails to acquire the synchronization successfully, it may be difficult for the terminal to receive the signals successfully.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure provides an apparatus and a method for successful synchronization in a wireless communication system.

Another aspect of the disclosure is to provide an apparatus and a method for recovering synchronization when synchronization fails in a wireless communication system.

Another aspect of the disclosure is to provide an apparatus and a method for recovering the synchronization of a component carrier (CC), which is out of synchronization, using the synchronization of a CC, which is in synchronization, in carrier aggregation (CA) of a wireless communication system.

Another aspect of the disclosure is to provide an apparatus and a method for recovering synchronization without going through radio link failure (RLF) or radio re-establishment (RRE) in a wireless communication system.

Another aspect of the disclosure is to provide an apparatus and a method for recovering synchronization through inter-frequency measurement.

Additional aspects will be set forth in part in the description which follows and, in part, will be apparent from the description, or may be learned by practice of the presented embodiments.

In accordance with an aspect of the disclosure, an apparatus of a terminal in a wireless communication system is provided. The apparatus includes at least one transceiver, and at least one processor configured to be operatively connected to the at least one transceiver, wherein the at least one processor may be configured to obtain a first synchronization of a first carrier that is in synchronization, determine a second synchronization of a second carrier that is out of synchronization based on the first synchronization, and perform communication based on the second synchronization.

In accordance with another aspect of the disclosure, an operating method of a terminal in a wireless communication system is provided. The operation method includes obtaining a first synchronization of a first carrier that is in synchronization, determining a second synchronization of a second carrier that is out of synchronization based on the first synchronization, and performing communication based on the second synchronization.

The apparatus and method according to various embodiments of the disclosure can quickly recover synchronization, thereby efficiently performing wireless communication.

Effects which can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to an apparatus and a method for recovering synchronization in a wireless communication system. Specifically, the disclosure describes a technique for recovering synchronization of a cell, which is out of synchronization, based on the synchronization of a cell, which is in synchronization, in a wireless communication system.

Terms {e.g., "carrier", "cell", "band", "carrier frequency", "band", "component carrier (CC)", etc.} referring to frequency, terms referring to network entities, terms referring to components of an apparatus, and the like, which are used hereinafter, are illustrative words for the convenience of explanation. Accordingly, the disclosure is not limited to the terms described below, and other terms having equivalent technical meanings may be used.

In addition, the disclosure will describe various embodiments using terms used in some communication standards {e.g., $3^{rd}$ generation partnership project (3GPP)}, but this is merely an illustrative example. The various embodiments of the disclosure may be easily modified and applied to other communication systems as well.

Figure 1:
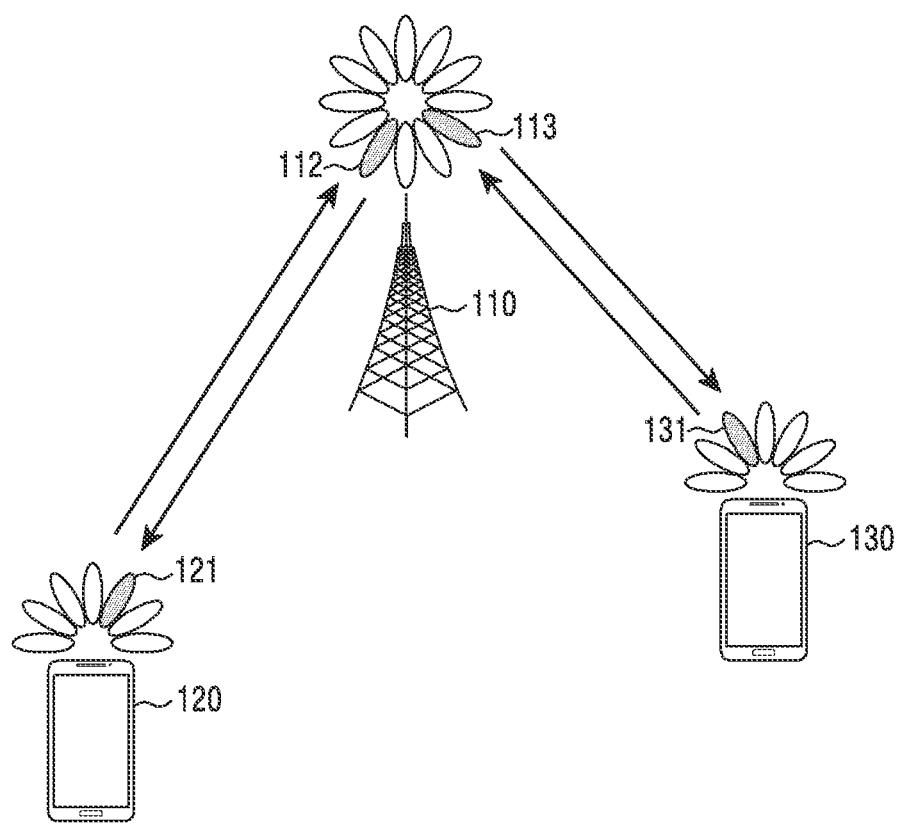
FIG. 1 illustrates a wireless communication system according to an embodiment of the disclosure.

FIG. 1 illustrates a wireless communication system according to an embodiment of the disclosure.

Referring to FIG. 1 illustrates a base station 110, a terminal 120, and a terminal 130 as parts of nodes using wireless channels in a wireless communication system.

The base station 110 is a network infrastructure element that provides wireless access to the terminals 120 and 130. The base station 110 has a coverage defined as a certain geographic area based on the distance over which signals can be transmitted. The base station 110 may be referred to as an "access point (AP)", an "eNodeB (eNB)", a "$5^{th}$ generation (5G) node", a "wireless point", or other terms having equivalent technical meanings, as well as a base station. According to various embodiments, the base station 110 may be connected to one or more "transmission/reception points (TRPs)". The base station 110 may transmit downlink signals to the terminal 120 or 130 or receive uplink signals from the terminal 120 or 130 via one or more TRPs.

The terminals 120 and 130 are devices used by a user and communicate with the base station 110 via wireless channels. In some cases, at least one of the terminals 120 and 130 may be operated without user involvement. That is, at least one of the terminals 120 and 130 may be a device for performing machine type communication (MTC), and may not be carried by a user. Each of the terminals 120 and 130 may be referred to as "user equipment (UE)", a "mobile station", a "subscriber station", "customer premises equipment (CPE)", a "remote terminal", a "wireless terminal", an "electronic device", a "user device", or other terms having equivalent technical meanings, as well as a terminal.

The base station 110, the terminal 120, and the terminal 130 may transmit and receive radio signals in a millimeter wave (mmWave) band (e.g., 28 GHz, 30 GHz, 38 GHz, or 60 GHz). In this case, in order to improve the channel gain, the base station 110, the terminal 120, and the terminal 130 may perform beamforming. The beamforming may include transmission beamforming and reception beamforming That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search or beam management procedure. After the serving beams 112, 113, 121, and 131 are selected, subsequent communication may be performed via resources that are in a quasi-co-located (QCL) relationship with the resources that transmitted the serving beams 112, 113, 121, and 131.

If the large-scale characteristics of the channel that carried the symbol on the first antenna port can be inferred from the channel that carried the symbol on the second antenna port, it can be determined that the first antenna port and the second antenna port are in a QCL relationship. For example, the large-scale characteristics may include at least one of delay spread, Doppler spread, Doppler shift, an average gain, average delay, and spatial receiver parameters.

Hereinafter, a cell may correspond to a carrier frequency in the disclosure. A plurality of cells can be classified according to the supported frequency and the area of a covering sector. In addition, the cell may indicate the area that can be covered by a single base station. One base station may cover one cell, or may cover multiple cells. "Base station" may be used as a term encompassing the cell, or "cell" may be used as a term referring to the base station.

Figure 2:
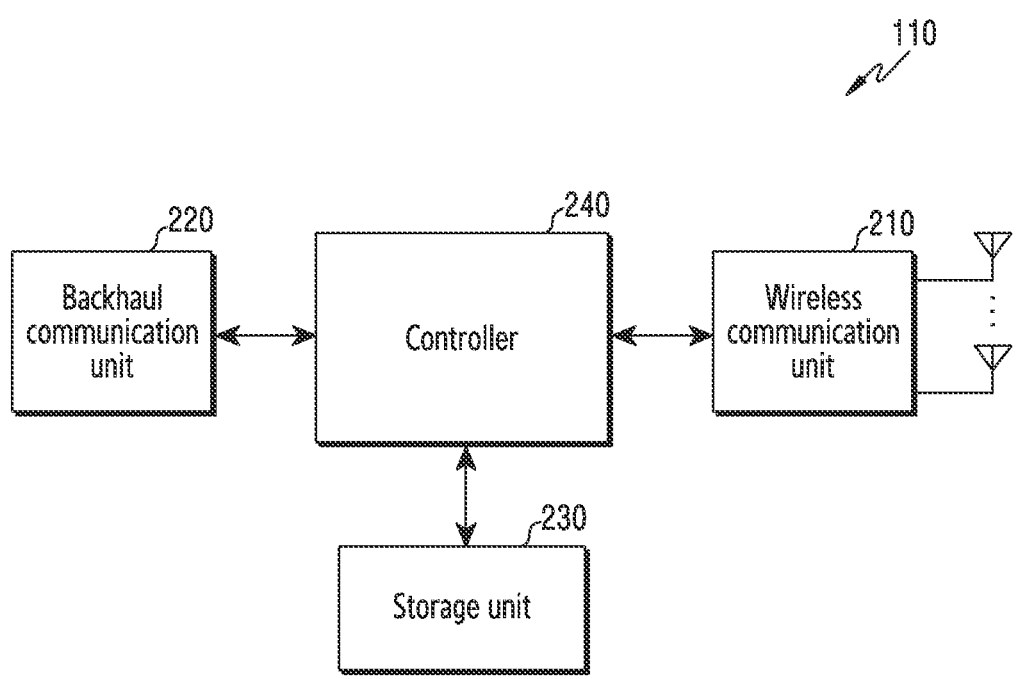
FIG. 2 illustrates a configuration of a base station in a wireless communication system according to an embodiment of the disclosure.

FIG. 2 illustrates a configuration of a base station in a wireless communication system according to an embodiment of the disclosure. The configuration illustrated in FIG. 2 may be regarded as the configuration of the base station 110. Hereinafter, the term "-unit", "-or (er)", or the like denotes a unit for processing at least one function or operation, and may be implemented as hardware, software, or a combination thereof.

Referring to FIG. 2, the base station 110 includes a wireless communication unit 210, a backhaul communication unit 220, a storage unit 230, and a controller 240.

The wireless communication unit 210 may perform functions of transmitting and receiving signals via a wireless channel. For example, the wireless communication unit 210 may perform a function of transformation between a baseband signal and a bit stream according to the physical layer standard of a system. For example, in the case of data transmission, the wireless communication unit 210 may generate complex symbols by encoding and modulating a transmission bit stream. In the case of data reception, the wireless communication unit 210 may restore a reception bit stream by demodulating and decoding a baseband signal. In addition, the wireless communication unit 210 may up-convert a baseband signal to a radio frequency (RF) band signal to thus transmit the same via an antenna, and may down-convert an RF band signal received via the antenna to a baseband signal.

To this end, the wireless communication unit 210 may include a transmitting filter, a receiving filter, an amplifier, a mixer, an oscillator, a digital-to-analog convertor (DAC), an analog-to-digital convertor (ADC), and the like. In addition, the wireless communication unit 210 may include a plurality of transmission/reception paths. Further, the wireless communication unit 210 may include at least one antenna array including a plurality of antenna elements. In terms of hardware, the wireless communication unit 210 may include a digital unit and an analog unit, and the analog unit may include a plurality of sub-units depending on the operation power, operation frequency, and the like.

The wireless communication unit 210 may transmit and receive signals. For example, the wireless communication unit 210 may transmit a synchronization signal, a reference signal, system information, messages, control information, data, and the like. The wireless communication unit 210 may also perform beamforming. The wireless communication unit 210 may apply a beamforming weight to a signal in order to assign directivity to a signal to be transmitted/received according to the setting of the controller 240.

The wireless communication unit 210 transmits and receives signals as described above. Accordingly, all or some of the wireless communication unit 210 may be referred to as a "transmitter", a "receiver", or a "transceiver". In the following description, the transmission and reception performed via a wireless channel will be used as a meaning to encompass the execution of the process by the wireless communication unit 210 as described above.

The backhaul communication unit 220 provides an interface for communication with other nodes in the network. That is, the backhaul communication unit 220 converts a bit stream, transmitted from the base station 110 to another node, such as another access node, another base station, an upper node, or a core network, into a physical signal and converts a physical signal received from another node into a bit stream.

The storage unit 230 stores data such as fundamental programs, application programs, and configuration information for the operation of the base station 110. The storage unit 230 may be configured as a volatile memory, a non-volatile memory, or a combination thereof. In addition, the storage unit 230 provides the stored data upon request by the controller 240.

The controller 240 controls the overall operation of the base station 110. For example, the controller 240 transmits and receives signals via the wireless communication unit 210 or the backhaul communication unit 220. The controller 240 writes or reads data to or from the storage unit 230. In addition, the controller 240 may perform the functions of a protocol stack required for the communication standard. To this end, the controller 240 may include at least one processor. According to various embodiments, the controller 240 may perform control such that the base station 110 performs operations, which will be described later, according to various embodiments.

Figure 3:
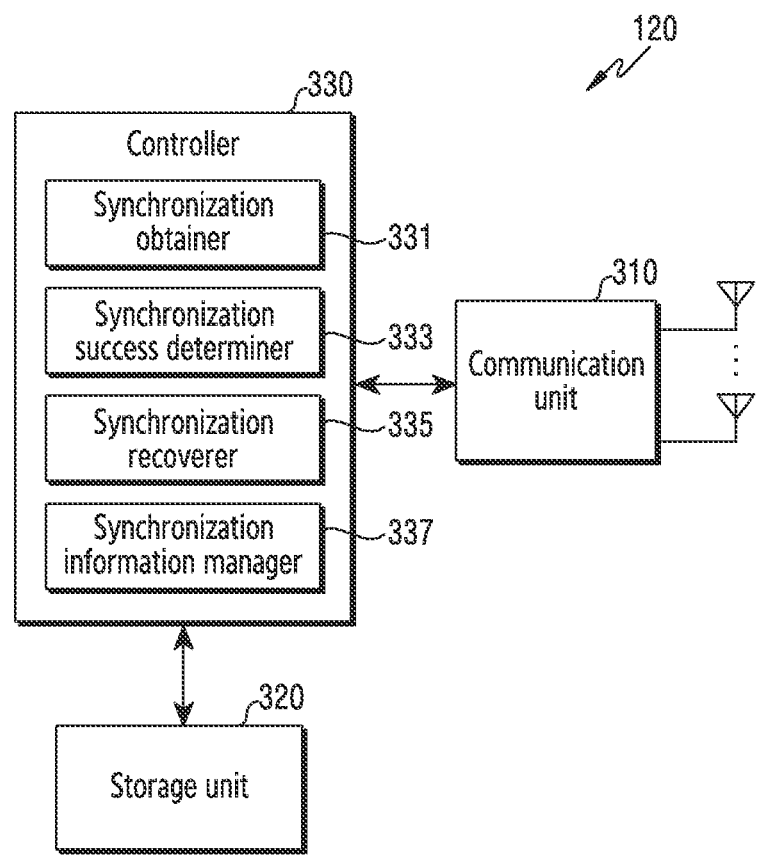
FIG. 3 illustrates a configuration of a terminal in a wireless communication system according to an embodiment of the disclosure.

FIG. 3 illustrates the configuration of a terminal in a wireless communication system according to an embodiment of the disclosure. The configuration illustrated in FIG. 3 may be regarded as the configuration of the terminal 120. Hereinafter, the term "-unit", "-or (er)", or the like denotes a unit for processing at least one function or operation, and may be implemented by hardware, software, or a combination thereof.

Referring to FIG. 3, the terminal 120 includes a communication unit 310, a storage unit 320, and a controller 330.

The communication unit 310 performs functions of transmitting and receiving signals via a wireless channel. For example, the communication unit 310 may perform a function of transformation between a baseband signal and a bit stream according to the physical layer standard of a system. For example, in the case of data transmission, the communication unit 310 may generate complex symbols by encoding and modulating a transmission bit stream. In the case of data reception, the communication unit 310 may restore a reception bit stream by demodulating and decoding a baseband signal. In addition, the communication unit 310 may up-convert a baseband signal to an RF band signal to thus transmit the same via an antenna, and may down-convert an RF band signal received via the antenna to a baseband signal. For example, the communication unit 310 may include a transmitting filter, a receiving filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit {e.g., radio frequency integrated circuit (RFIC)}. The digital circuit and the analog circuit may be implemented as a single package. In addition, the communication unit 310 may include a plurality of RF chains. The communication unit 310 may perform beamforming. The communication unit 310 may apply a beamforming weight to a signal in order to assign directivity to a signal to be transmitted/received according to the setting of the controller 330.

In addition, the communication unit 310 may transmit and receive signals. For example, the communication unit 310 may receive a synchronization signal, a reference signal, system information, messages, control information, data, and the like.

In addition, the communication unit 310 may include different communication modules to process signals in different frequency bands from each other. Furthermore, the communication unit 310 may include a plurality of communication modules to support a plurality of different wireless access technologies. For example, the different wireless access technologies may include Bluetooth low energy (BLE), Wi-Fi, Wi-Fi gigabyte (WiGig), cellular networks {e.g., long term evolution (LTE) or new radio (NR)}, and the like. In addition, different frequency bands may include a super-high frequency (SHF) (e.g., 2.5 GHz or 5 GHz) band and a millimeter wave (e.g., 38 GHz or 60 GHz) band.

The communication unit 310 transmits and receives signals as described above. Accordingly, all or some of the communication unit 310 may be referred to as a "transmitter", a "receiver", or a "transceiver". In the following description, the transmission and reception performed via a wireless channel will be used as a meaning to encompass the execution of the process by the communication unit 310 as described above.

The storage unit 320 may store data such as fundamental programs for the operation of the terminal 120, application programs, and data such as configuration information. The storage unit 320 may be configured as a volatile memory, a non-volatile memory, or a combination thereof. In addition, the storage unit 320 provides the stored data upon request by the controller 330. According to various embodiments, the storage unit 320 may store synchronization information. The synchronization information may include a carrier frequency (i.e., synchronization information on each CC). In addition, according to various embodiments, the storage unit 320 may store beam information. The beam information may relate to a CC. According to an embodiment, the beam information may include a group of beams. According to various embodiments, the storage unit 320 may include information {e.g., timing advance (TA) information) related to the physical location of the cell. According to various embodiments, the storage unit 320 may include statistical information (e.g., the amount of synchronization variation) related to the synchronization.

The controller 330 controls the overall operation of the terminal 120. For example, the controller 330 transmits and receives signals via the communication unit 310. The controller 330 writes or reads data to or from the storage unit 320. The controller 330 may perform the functions of a protocol stack required for the communication standard. To this end, the controller 330 may include at least one processor or micro-processor, or may be a part of a processor. In addition, a part of the communication unit 310 and the controller 330 may be referred to as a "CP". The controller 330 may include various modules for performing communication.

According to various embodiments, the controller 330 may include a synchronization obtainer 331 for obtaining synchronization from the signal of a cell, a synchronization success determiner 333 for determining whether or not the cell is in synchronization or out of synchronization depending on whether or not the synchronization of the cell satisfies a predetermined condition, a synchronization recoverer 335 for recovering the synchronization of a cell and determining the success or failure of synchronization of the cell according to the synchronization recovery procedure of the disclosure, and a synchronization information manager 337 for controlling synchronization information for each cell or each beam. The synchronization obtainer 331, the synchronization success determiner 333, the synchronization recoverer 335, and the synchronization information manager 337, which are a set of instructions or codes stored in the storage unit 320, may be instructions/codes residing at least temporarily in the controller 330, a storage space storing the instructions/codes, a part of the circuitry constituting the controller 330, or a module for performing the function of the controller 330. According to various embodiments, the controller 330 may perform control such that the terminal performs the operations according to various embodiments described below.

Although it is not shown in FIG. 3, in some embodiments, the terminal may further include separate hardware such as a free running counter (FRC). The FRC is a component that provides a reference value for indicating the cell time. The terminal may use the FRC and a cell timer for each carrier, thereby determining the success or failure of synchronization for each carrier and compensating for synchronization of a specific cell based on the synchronization of another cell. In this case, the FRC may be connected to the respective cell timers to thus provide a reference value. In some embodiments, the apparatus further comprises a free running counter (FRC), the FRC configured to provide a reference value indicating cell time.

The configuration of the terminal shown in FIG. 3 is only an example of a terminal, and the terminal is not limited thereto. That is, some configurations may be added, excluded, or modified according to various embodiments. For example, the synchronization success determiner 333 of the controller 330 may be implemented as an independent configuration for each cell configured for the CA. For example, the above-described FRC may be functionally implemented as a component of the controller 330.

Figure 4A:
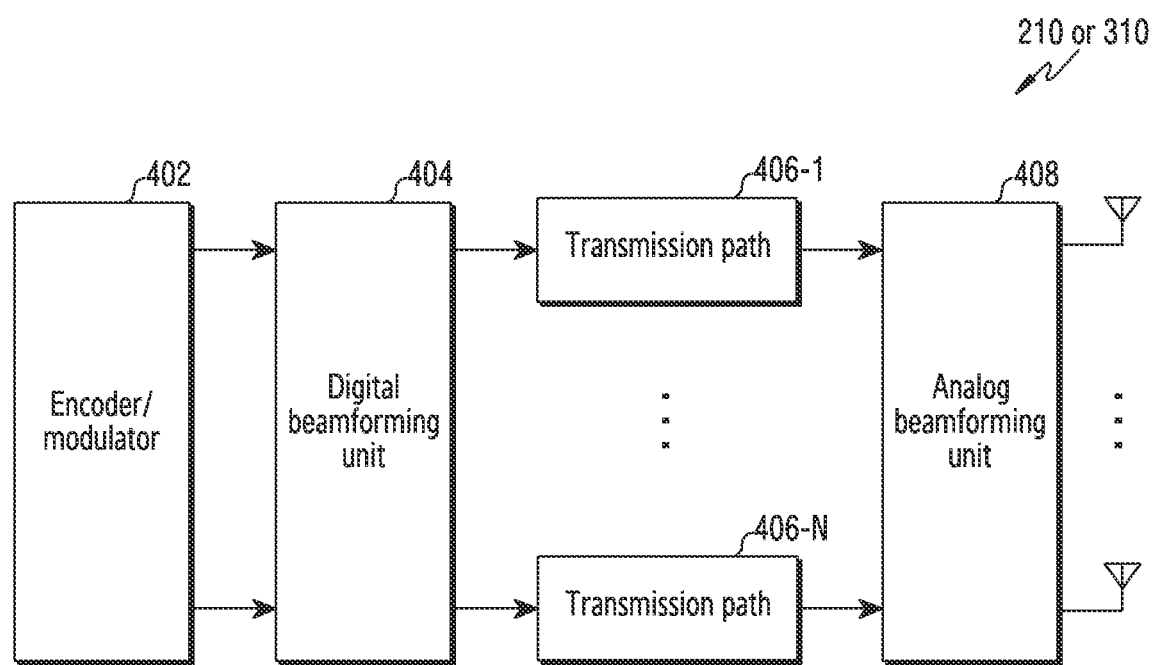
FIG. 4A illustrates a configuration of a communication unit in a wireless communication system according to an embodiment of the disclosure.

FIG. 4A illustrates the configuration of a communication unit in a wireless communication system according to an embodiment of the disclosure.

Figure 4B:
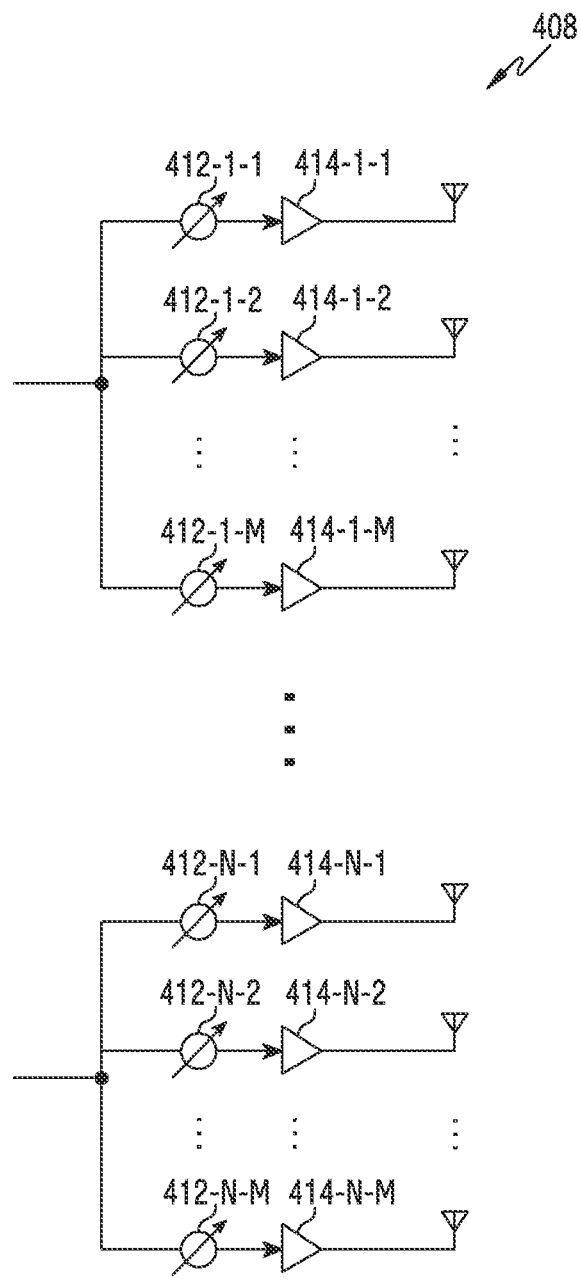
FIG. 4B illustrates a configuration of a communication unit in a wireless communication system according to an embodiment of the disclosure.

FIG. 4B illustrates the configuration of a communication unit in a wireless communication system according to an embodiment of the disclosure.

Figure 4C:
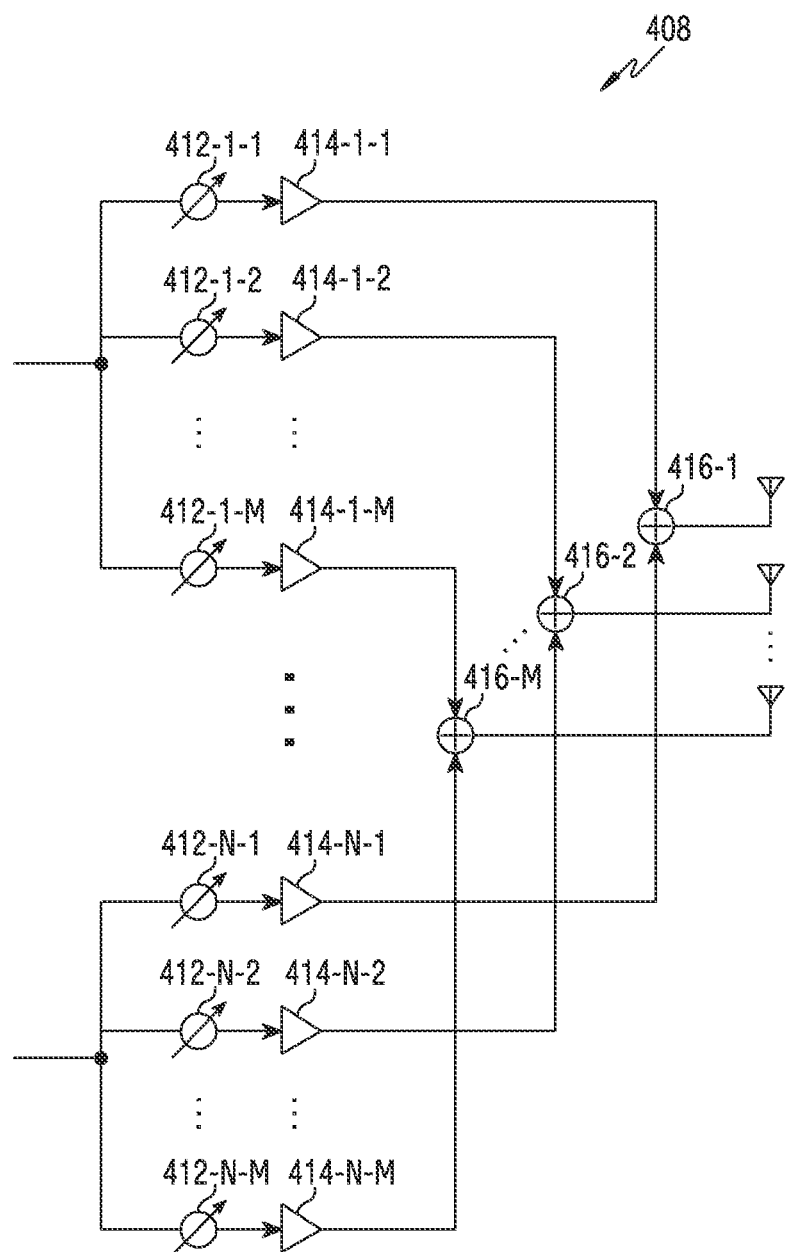
FIG. 4C illustrates a configuration of a communication unit in a wireless communication system according to an embodiment of the disclosure.

FIG. 4C illustrates the configuration of a communication unit in a wireless communication system according to an embodiment of the disclosure. FIGS. 4A to 4C show examples of the detailed configuration of the wireless communication unit 210 in FIG. 2 or the communication unit 310 in FIG. 3. More specifically, FIGS. 4A to 4C illustrate components for performing beamforming as parts of the wireless communication unit 210 in FIG. 2 or the communication unit 310 in FIG. 3.

Referring to FIG. 4A, the wireless communication unit 210 or the communication unit 310 includes an encoder/modulator 402, a digital beamforming unit 404, a plurality of transmission paths 406-1 to 406-N, and an analog beamforming unit 408.

The encoder/modulator 402 performs channel encoding. At least one of low-density parity check (LDPC) code, convolution code, and polar code may be used for the channel encoding. The encoder/modulator 402 generates modulation symbols by performing constellation mapping.

The digital beamforming unit 404 performs beamforming for digital signals (e.g., modulation symbols). To this end, the digital beamforming unit 404 multiplies the modulation symbols by beamforming weights. The beamforming weights may be used to change the magnitude and phase of the signal, and may be referred to as a "precoding matrix", a "precoder", or the like. The digital beamforming unit 404 outputs digital-beamformed modulation symbols to a plurality of transmission paths 406-1 through 406-N. In this case, according to a multiple-input multiple-output (MIMO) transmission scheme, the modulation symbols may be multiplexed, or the same modulation symbol may be provided to the plurality of transmission paths 406-1 through 406-N.

The plurality of transmission paths 406-1 through 406-N convert the digital signals, which are digitally beamformed, into analog signals. To this end, each of the plurality of transmission paths 406-1 to 406-N may include an inverse fast Fourier transform (IFFT) operator, a cyclic prefix (CP) inserter, a DAC, and an up-converter. The CP inserter is intended for an orthogonal frequency division multiplexing (OFDM) scheme, and may be excluded in the case where other physical layer schemes {e.g., filter bank multi-carrier (FBMC)} are applied. That is, the plurality of transmission paths 406-1 through 406-N provide independent signal processing procedures for the plurality of streams generated through digital beamforming. However, depending on the implementation, some of the components of the plurality of transmission paths 406-1 through 406-N may be used in common.

The analog beamforming unit 408 performs beamforming on the analog signals. To this end, the digital beamforming unit 404 multiplies the analog signals by beamforming weights. The beamforming weights are used to change the magnitude and phase of the signals. More specifically, the analog beamforming unit 408 may be configured as shown in FIG. 4B or 4C depending on the connection structures between the plurality of transmission paths 406-1 to 406-N and the antennas.

Referring to FIG. 4B, signals input to the analog beamforming unit 408 are processed with operations of phase/magnitude conversion and amplification and then transmitted through the antennas. At this time, the signals of the respective paths are transmitted through different sets of antennas (i.e., antenna arrays). As to the processing of a signal input through a first path, the signal is converted into signal streams having the same or different phases/magnitudes by the phase/magnitude converters 412-1-1 to 412-1-M, amplified by the amplifiers 414-1-1 to 414-1-M, and then transmitted through the antennas.

Referring to FIG. 4C, signals input to the analog beamforming unit 408 are processed with operations of phase/magnitude conversion and amplification and then transmitted through the antennas. At this time, the signals of the respective paths are transmitted through the same set of antennas (i.e., antenna array). As to the processing of a signal input through a first path, the signal is converted into signal streams having the same or different phases/magnitudes by the phase/magnitude converters 412-1-1 to 412-1-M and amplified by the amplifiers 414-1-1 to 414-1-M. In addition, the amplified signals are summed by the adders 416-1-1 to 416-1-M so as to be transmitted through one antenna array based on the antenna elements, and are then transmitted through the antennas.

FIG. 4B shows an example in which an independent antenna array is used for each transmission path, and FIG. 4C shows an example in which transmission paths share one antenna array. However, according to another embodiment, some transmission paths may use independent antenna arrays, and the remaining transmission paths may share one antenna array. According to another embodiment, a structure that adaptively changes depending on the situation may be used by applying a switchable structure between the transmission paths and the antenna arrays.

In next generation communication system standards, such as pre-5G or new radio (NR), operation of a shorter transmission time interval (TTI) is under consideration. As the TTI becomes shorter, the length of the cyclic prefix (CP) in the symbol, as well as the symbol, becomes shorter, which may increase the failure of synchronization. In addition, since the influence of frequency selectivity is increased due to the increase in the transmission bandwidth, the synchronization may be broken between the carrier frequencies. Furthermore, since beamforming due to transmission in a high-frequency band is supported, synchronization further varies depending on the physical location of the base station providing the cell.

Therefore, it is required to control synchronization more strictly in future communication systems. If radio link failure (RLF) is declared and time synchronization is recovered through RRE {radio resource control (RRC) connection re-establishment} for every synchronization failure, data transmission/reception is interrupted during the execution of the RRE, so that the user experiences deterioration in communication quality such as interruption of a streaming service or degradation of the quality of service (QoS). In addition, since additional procedures, such as a procedure for searching for a new beam (e.g., beam search or beam sweeping), are required in standards supporting beamforming, the communication quality may be further degraded.

Thus, hereinafter, a method for recovering synchronization of a cell that is out of synchronization, even when the cell is out of synchronization, based on the synchronization of a cell that is in synchronization, instead of immediately performing a reconnection procedure, such as RRE, will be described. Now, a method for recovering synchronization will be described with reference to FIG. 5.

Figure 5:
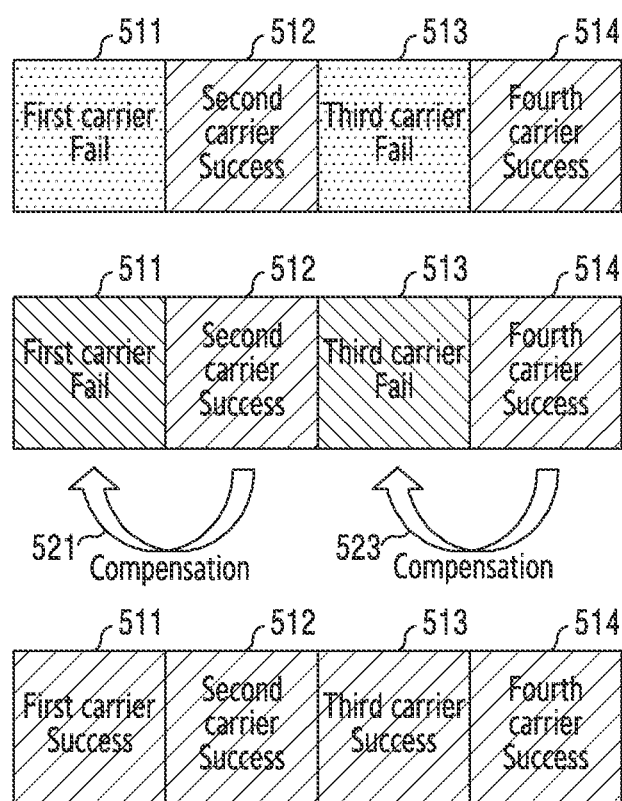
FIG. 5 illustrates an example of synchronization compensation according to an embodiment of the disclosure.

FIG. 5 illustrates an example of synchronization recovery according to an embodiment of the disclosure. The terminal may perform carrier aggregation (CA) including a plurality of component carriers (CCs). The CC is a frequency unit of serving cells constituting the CA, and may be referred to as a "carrier frequency", a "carrier frequency band", a "carrier", or the like. Hereinafter, the CC will be referred to as a "carrier" for description.

Referring to FIG. 5, the terminal may perform the CA through four carriers (a first carrier 511, a second carrier 512, a third carrier 513, and a fourth carrier 514). The terminal may transmit or receive data through four carriers. The terminal is required to successfully obtain synchronization for each of the four carriers in order to operate the four carriers.

The terminal may receive a synchronization signal. For example, the terminal may receive a physical synchronization signal (PSS) from a base station. The terminal may obtain the cell time of the cell based on the synchronization signal. The cell time refers to the synchronization of the carrier. That is, determining the synchronization of the carrier means determining the cell time of the cell providing the corresponding carrier. The terminal may determine the success or failure of synchronization of a carrier from the cell time. Hereinafter, an example in which the synchronization for the second carrier 512 and the fourth carrier 514, which is performed by the terminal, succeeded, but the synchronization for the first carrier 511 and the third carrier 513 failed will be described. In the disclosure, "success of synchronization" means that the carrier becomes synchronized {the situation in which an error between each resource boundary (e.g., symbol boundary) of the base station and the resource boundary of the terminal is within a predetermined range}, and "failure of synchronization" means that the carrier becomes out of synchronization {the situation in which an error between each resource boundary (e.g., symbol boundary) of the base station and the resource boundary of the terminal is out of a predetermined range}.

The terminal is required to recover synchronization of the cells that are out of synchronization. If the terminal does not recover the synchronization of a cell that is out of synchronization, the terminal will continuously decode signals at the erroneously obtained cell time, so that the terminal cannot properly receive control information or data, and additionally wastes power. In addition, if reconnection, such as an RRE procedure or deletion/addition of the Scell is performed in order to re-obtain synchronization, data interruption occurs, thereby causing degradation of communication quality.

The terminal according to various embodiments may obtain synchronization of carriers (e.g., the first carrier 511 and the third carrier 513) of a cell that is out of synchronization based on the synchronization of carriers (e.g., the second carrier 512 and the fourth carrier 514) of a cell that is in synchronization. The procedure of obtaining the synchronization of the carrier of a cell that is out of synchronization based on the synchronization of the carrier of a cell that is in synchronization will be referred to as "synchronization compensation" in the disclosure. For example, the terminal may obtain the compensated synchronization 521 of the first carrier 511 through the synchronization compensation based on the synchronization of the second carrier 512. In addition, the terminal may obtain the compensated synchronization 523 of the third carrier 513 through synchronization compensation based on the synchronization of the fourth carrier 514.

The terminal may determine whether or not the synchronization of each carrier is successful after the synchronization compensation. The terminal may determine whether or not the synchronization of the carrier, which is out of synchronization, is recovered (hereinafter, referred to as "synchronization recovery"). That is, the terminal may determine whether or not the synchronization of the carrier, which is out of synchronization, is recovered based on the synchronization of the carrier that is out of synchronization, which is obtained through the synchronization compensation. In other words, the terminal may determine whether or not the carrier, which was out of synchronization at first, becomes synchronized through the synchronization compensation. For example, the terminal may determine the success of synchronization of the first carrier 511 through the compensated synchronization 521. In addition, the terminal may determine the success of synchronization of the third carrier 513 through the compensated synchronization 523.

If all the carriers configured for the CA becomes synchronized, the terminal may transmit or receive data via the CA. Although it is not shown in FIG. 5, if synchronization of some carriers is not recovered, the terminal may perform the RRE or perform the Scell deletion/addition.

As described with reference to FIG. 5, the terminal may recover synchronization of a carrier through the synchronization compensation. When the CA is set, the terminal may perform synchronization compensation independently for each carrier. Although FIG. 5 has been described based on the CA, the disclosure is not limited thereto. The disclosure can be applied to any communication procedure for performing synchronization compensation to determine the synchronization of a carrier based on synchronization of another carrier. For example, in the case where a specific carrier is out of synchronization, the terminal may determine the synchronization of the specific carrier based on synchronization information of another carrier, which is obtained through inter-frequency measurement. Hereinafter, the operations of the terminal for synchronization compensation or synchronization recovery will be described with reference to FIGS. 6 and 7.

Figure 6:
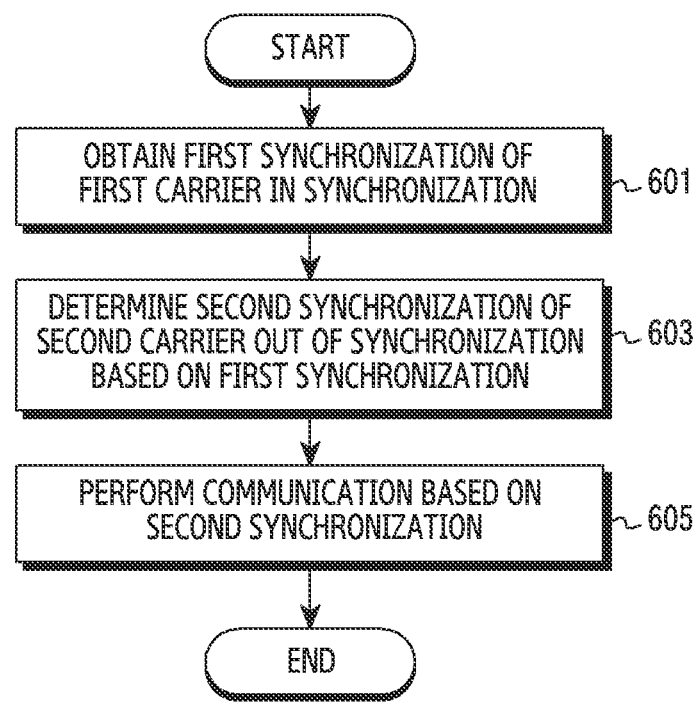
FIG. 6 illustrates a flowchart of a terminal for synchronization compensation according to an embodiment of the disclosure.

FIG. 6 illustrates a flowchart of a terminal for synchronization recovery according to an embodiment of the disclosure. The terminal may be the terminal 120 in FIG. 1.

Referring to FIG. 6, the terminal may obtain the first synchronization of a first carrier that is in synchronization in operation 601. The terminal may identify the first carrier in synchronization. The terminal may determine the success or failure of synchronization of each carrier in order to identify the first carrier in synchronization.

The terminal may determine whether or not respective carriers are in synchronization. The terminal may determine whether respective cells are in synchronization or out of synchronization. The terminal may obtain synchronization of each of a plurality of carriers for the terminal, and may determine the success or failure of synchronization of each cell according to the obtained synchronization. The synchronization acquisition and the determination on the success or failure of synchronization may be independently performed for each carrier.

The terminal may determine the success or failure of synchronization of a carrier. For example, the terminal may determine the success or failure of synchronization of the corresponding cell based on whether or not a synchronization signal correlation value is detected during the time corresponding to the synchronization. In addition, the terminal may determine the success or failure of synchronization of the corresponding cell according to, for example, whether or not the time corresponding to the synchronization is within a predetermined range. In addition, the terminal may determine the success or failure of synchronization of the corresponding cell based on, for example, the channel quality.

At least one carrier that is in synchronization, among a plurality of carriers, may include the first carrier. The terminal may obtain the first synchronization of the first carrier. The acquisition of the first synchronization means that the cell time of the first cell is determined. The cell time means the time at which a signal (e.g., a synchronization signal) of the cell is transmitted within an absolute time period (e.g., 10 ms). The terminal may determine the cell time of the first cell from the synchronization signal transmitted through the first cell. For example, the terminal may receive the PSS transmitted through the first cell twice, thereby determining the cell time of the first cell. The first synchronization may be the cell time of the first cell, which is obtained when the success or failure of the synchronization is determined.

In operation 603, the terminal may determine the second synchronization of the second carrier that is out of synchronization based on the first synchronization. The terminal may identify the second carrier that is out of synchronization. The terminal may identify at least one carrier that is out of synchronization from among a plurality of carriers when determining the success or failure of synchronization of each carrier in operation 601. At least one carrier that is out of synchronization includes the second carrier.

The terminal may perform synchronization compensation based on the first synchronization in order to determine the second synchronization. The synchronization compensation includes an operation of determining compensated synchronization to be applied as the second synchronization. As described above, the terminal identifies at least one carrier that is in synchronization for the synchronization compensation. At least one carrier that is in synchronization includes the first carrier.

According to various embodiments, the terminal may perform synchronization compensation based on the synchronization of the at least one carrier in synchronization. That is, the terminal may perform synchronization compensation using all the carriers that are in synchronization. Alternatively, according to various embodiments, the terminal may perform synchronization compensation based on the synchronization of some of one or more carriers that are in synchronization. That is, the terminal may perform synchronization compensation using some carriers (hereinafter, referred to as "compensation carriers") suitable for the synchronization compensation, among the carriers that are in synchronization, instead of using all the carriers in synchronization.

The terminal may perform synchronization compensation based on the synchronization of the compensation carrier. The terminal may identify a compensation carrier, among one or more carriers that are in synchronization. The compensation carrier may include the first carrier. In some embodiments, the terminal may identify the first carrier according to a metric for at least one carrier that is in synchronization. For example, the terminal may identify the first carrier based on a gradient of synchronization, among one or more carriers that are in synchronization. In some other embodiments, the terminal may identify the first carrier from among one or more carriers that are in synchronization based on the second carrier that is out of synchronization. For example, the base station in the second cell providing the second carrier may be associated with the first cell. In addition, for example, the second carrier may be adjacent to the frequency band of the first cell. In addition, for example, the beam for the second carrier may be the same as the beam for the first carrier.

The terminal may apply an average weight or individual weights to the synchronization of one or more carriers in synchronization or one or more compensation carriers, thereby performing synchronization compensation. The individual weights may be determined based on the frequency characteristics, statistical characteristics, and physical characteristics of the respective carriers. The terminal may determine the second synchronization of the second carrier through the synchronization compensation. For example, the terminal may average the synchronization of three compensation carriers, thereby determining the compensated synchronization. The terminal may determine the compensated synchronization as the second synchronization of the second carrier that is out of synchronization. That is, the terminal may determine the cell time corresponding to the compensated synchronization as the cell time for the second carrier.

In some embodiments, the at least one processor is further configured to apply an individual weight to the first synchronization.

In operation 605, the terminal may perform communication based on the second synchronization. The terminal may determine whether or not the synchronization of the second carrier has been recovered based on the second synchronization. In other words, the terminal may determine the success or failure of synchronization of the second carrier based on the second synchronization. For example, the terminal may determine the success or failure of synchronization of the second cell providing the second carrier based on whether or not a synchronization signal correlation value is detected during the time corresponding to the second synchronization. In addition, the terminal may determine the success or failure of synchronization of the second cell based on, for example, whether or not the time corresponding to the second synchronization is within a predetermined range. In addition, the terminal may determine the success or failure of synchronization of the second cell based on, for example, the channel quality of a signal according to the second synchronization.

According to an embodiment, the condition for determining the success or failure of synchronization in operation 605 may be the same as or similar to the condition for determining the success or failure of synchronization of each cell in operation 601. In addition, even though the parameters for the determination condition are the same between operation 601 and operation 605, threshold values for determining whether or not a specific condition is satisfied may be different. According to another embodiment, the condition for determining the success or failure of synchronization in operation 605 may be independent of the condition for determining the success or failure of synchronization of each cell in operation 601.

If the synchronization of the second carrier is successful, the terminal may perform communication. If there are other carriers that are out of synchronization, in addition to the second carrier, the terminal may determine whether or not to recover the synchronization of the other carriers that are out of synchronization. If the synchronization of all the carriers set for the terminal is recovered, the terminal may perform communication. If the synchronization of the second carrier fails, the terminal may re-establish the connection with the base station in order to newly detect the synchronization for the second cell. For example, the terminal may perform the RRE. In addition, if the second cell is, for example, an Scell, the terminal may perform deletion and addition of the Scell.

According to various embodiments of the disclosure, when the synchronization of a carrier, which is in synchronization, is changed, the compensated synchronization determined for a carrier, which is out of synchronization, may be changed as well. That is, as the synchronization of the carrier in synchronization (e.g., the first synchronization in operation 601) is changed, a synchronization determination value of the carrier performed with synchronization compensation (e.g., the second synchronization in operation 603) is changed, thereby verifying whether or not the disclosure can be implemented. According to some embodiments, the cell time of the carrier {e.g., primary component carrier (PCC)}, which is out of synchronization, may be changed to the cell time of the carrier {e.g., secondary component carrier (SCC)}, which is in synchronization. The implementation of the disclosure may also be verified according to the detection of the above change operation.

The synchronization compensation procedure has been described with reference to FIG. 6. Now, the operational flow of the terminal for determining the success or failure of synchronization of the carriers constituting the CA according to the synchronization compensation procedure of the disclosure will be described with reference to FIG. 7.

Figure 7:
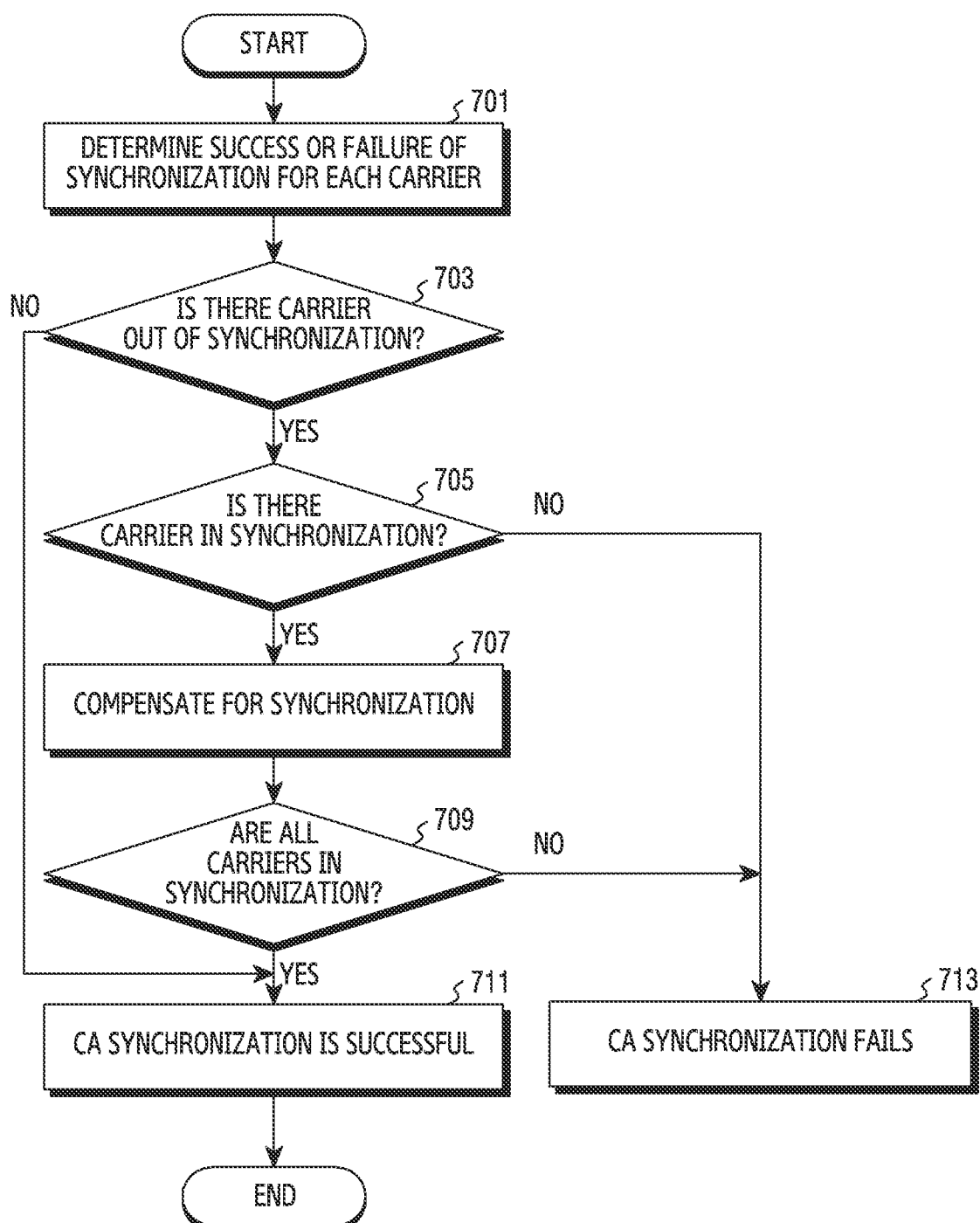
FIG. 7 illustrates a flowchart of a terminal for determining a success or failure of synchronization in carrier aggregation (CA) according to an embodiment of the disclosure.

FIG. 7 illustrates a flowchart of a terminal for determining a success or failure of synchronization in the CA according to an embodiment of the disclosure. The terminal may be the terminal 120 in FIG. 1.

Referring to FIG. 7, the terminal may determine the success or failure of synchronization for each carrier in operation 701. The terminal may determine the success or failure of synchronization for each of the carriers configured for the CA of the terminal. The determination on the success or failure of synchronization may be performed independently for each carrier. An example of detailed determination on the success or failure of synchronization will be described with reference to FIGS. 8A and 8B.

In operation 703, the terminal may determine whether or not there is a carrier that is out of synchronization. The terminal may determine whether or not there is a carrier that is out of synchronization, among the carriers configured for the terminal, based on the result obtained in operation 701. The terminal may perform operation 705 if there is at least one carrier that is out of synchronization. On the other hand, if there is no carrier that is out of synchronization, the terminal may perform operation 711.

In operation 705, the terminal may determine whether or not there is a carrier that is in synchronization. The terminal may determine whether or not there is a carrier that is in synchronization, among the carriers configured for the terminal, based on the result obtained in operation 701. If there is a carrier that is in synchronization, the terminal may perform operation 707. On the other hand, if there is no carrier that is in synchronization (that is, if all of the carriers are out of synchronization), the terminal may perform operation 713. This is due to the fact that if the synchronization of a carrier that is out of synchronization is compensated for using another carrier that is out of synchronization, the synchronization may further deteriorate.

In operation 707, the terminal may perform synchronization compensation. The terminal may identify at least one compensation carrier from one or more carriers that are in synchronization. "Compensation carrier" refers to a carrier that provides the synchronization obtained for synchronization compensation.

According to various embodiments, the terminal may identify at least one compensation carrier based on a carrier that is out of synchronization. In some embodiments, the compensation carrier may be within a threshold range in the frequency domain of the carrier that is out of synchronization. That is, the compensation carrier may be a carrier adjacent to the carrier that is out of synchronization. The influence of frequency selectivity increases due to the increasing bandwidth. Since the synchronization may vary as the frequencies differ considerably between carriers, the terminal may determine the carrier adjacent to the carrier, which is out of synchronization, to be the compensation carrier.

In some embodiments, the compensation carrier may be associated with a beam of a carrier that is out of synchronization. For example, the compensation carrier may be provided to the terminal via the same beam as that of the carrier that is out of synchronization. The beam may be a terminal beam. The terminal can increase the accuracy of the synchronization compensation in the carriers corresponding to the same beam information by applying synchronization information to each other. As another example, even if the compensation carrier is not the same as the beam of the carrier that is out of synchronization, it may be provided to another terminal via another beam in the same beam group. The beam group may be a set of beams having similar beam directions. This is due to the fact that the similarity between the synchronization may be relatively high because the paths of the transmitted signals are similar in the case of similar beam directions. Although the description has been made based on the beam of the terminal, the beam pair link or information on the beam of the base station may also be used to determine the compensation carrier. For example, the terminal may identify, as a compensation carrier, the carrier provided by means of the same beam of the same base station as the carrier that is out of synchronization, among the carriers that are in synchronization.

In some embodiments, the compensation carrier may be associated with a base station providing a carrier that is out of synchronization. That is, the terminal may identify the compensation carrier in consideration of the physical arrangement of the cells. For example, the base station providing the compensation carrier may be the same as the base station providing a carrier that is out of synchronization. The terminal may identify the compensation carrier based on a timing advance group (TAG). As another example, the base station providing the compensation carrier may be located within a predetermined physical range from the base station providing the carrier that is out of synchronization. The terminal may identify the compensation carrier based on a TAG. This is due to the fact that the similarity between the synchronization may be increased if the physical locations of the base stations are the same or similar.

According to various embodiments, the terminal may identify at least one compensation carrier according to the channel quality of each of one or more carriers that are in synchronization. The channel quality may be at least one of a signal-to-interference and noise ratio (SINR), a carrier-to-interference and noise ratio (CINR), a beam reference signal received power (BRSRP), a reference signal received power (RSRP), a reference signal received quality (RSRQ), a received signal strength indicator (RSRI), an error vector magnitude (EVM), a bit error rate (BER), and a block error rate (BLER). Hereinafter, the SINR will be described as an example of the channel quality. In the disclosure, high channel quality denotes the case where a channel quality value related to a signal magnitude is large or a channel quality value related to an error rate is small. The higher the channel quality, the better the wireless communication environment that may be provided.

In some embodiments, the terminal may identify a carrier with high channel quality as a compensation carrier. This is due to the fact that the higher the channel quality, the higher the reliability of the channel. For example, the terminal may measure the RSRP of a synchronization signal of each of the carriers. The terminal may identify, as compensation carriers, the top N (N is an integer) carriers with high RSRP of the synchronization signal, among the carriers that are in synchronization.

In some other embodiments, the terminal may identify at least one compensation carrier, among one or more carriers that are in synchronization, based on the degree of change in the synchronization. For example, the terminal may identify the carrier with the lowest degree of change in synchronization as a compensation carrier. This is due to the fact that the lowest degree of change means that the reliability of the obtained synchronization is high. As another example, if the amount of change in the synchronization of the carrier in synchronization alternates between negative numbers and positive numbers, the terminal may not identify the corresponding carrier as a compensation carrier. This is due to the fact that even though the carrier becomes synchronized, the reliability of the obtained synchronization may be low.

Although the conditions for identifying the compensation carrier have been described above, the disclosure is not limited thereto. According to various embodiments, the terminal may identify at least one compensation carrier by combining two or more of the above-described conditions (e.g., frequency domain, beam, base station, channel quality, and the like).

The terminal may determine the synchronization of the carrier, which is out of synchronization, based on the synchronization of each of the identified compensation carriers. For example, the terminal may determine the timing value (i.e., cell time) for the synchronization of the first carrier, which is the compensation carrier, as the timing value for the synchronization of the second carrier that is out of synchronization. The terminal may decode a signal of the second carrier according to the subframe boundary of the first carrier. As another example, the terminal may determine the average value of the compensation carriers as the synchronization of the second carrier that is out of synchronization.

The terminal may determine the synchronization of the carrier that is out of synchronization, thereby performing synchronization compensation. If there are two or more carriers that are out of synchronization, the terminal may perform synchronization compensation for the respective carriers out of synchronization. In some embodiments, the terminal may use the carrier on which synchronization compensation is performed as a compensation carrier. The terminal may use the carrier on which synchronization compensation is performed as a compensation carrier to perform synchronization compensation for the carrier that is out of synchronization. In some other embodiments, the terminal may perform synchronization compensation for the respective carriers that are out of synchronization. Hereinafter, an example of detailed determination of the synchronization compensation will be described with reference to FIGS. 9 to 11B.

In operation 709, the terminal may determine whether or not all the carriers have become synchronized. The terminal may determine whether or not all the carriers constituting the CA of the terminal become synchronized. The terminal may skip the determination of the success or failure of synchronization of the carrier that is in synchronization as a result of operation 701. The terminal may re-perform the determination of the success or failure of synchronization of the carrier that is out of synchronization as a result of operation 701. The terminal may determine the success or failure of synchronization of the carrier that is out of synchronization based on the synchronization determined according to the synchronization compensation in operation 707. In other words, the terminal may determine whether or not to recover the synchronization of the carrier that is out of synchronization according to the synchronization compensation in operation 707. The terminal may perform operation 711 if all the carriers are in synchronization. On the other hand, if there is a carrier that is out of synchronization, the terminal may perform operation 713.

In operation 711, the terminal may determine the success of synchronization for the CA. The terminal may perform the CA. The terminal may transmit or receive data via the configured carriers. In operation 713, the terminal may determine the failure of synchronization for the CA. In the case of the failure of synchronization for the CA, in some embodiments, the terminal may perform deletion/modification of the Scell, or may perform a new reconnection procedure. In some other embodiments, the terminal may re-perform the illustrated synchronization compensation procedure. In addition, in some other embodiments, the terminal may maintain a connection with the base station until the number of carriers that are out of synchronization exceeds a specified value. An example of the detailed determination of whether or not the synchronization is recovered will be described with reference to FIG. 12.

Although FIG. 7 illustrates that operations 703 to 705 are performed after the success or failure of synchronization of each carrier is determined in operation 701, the disclosure is not limited thereto. The terminal may perform operation 703 even if only one carrier that is out of synchronization is detected, or may perform operation 705 even if only one carrier that is in synchronization is detected.

Figure 8A:
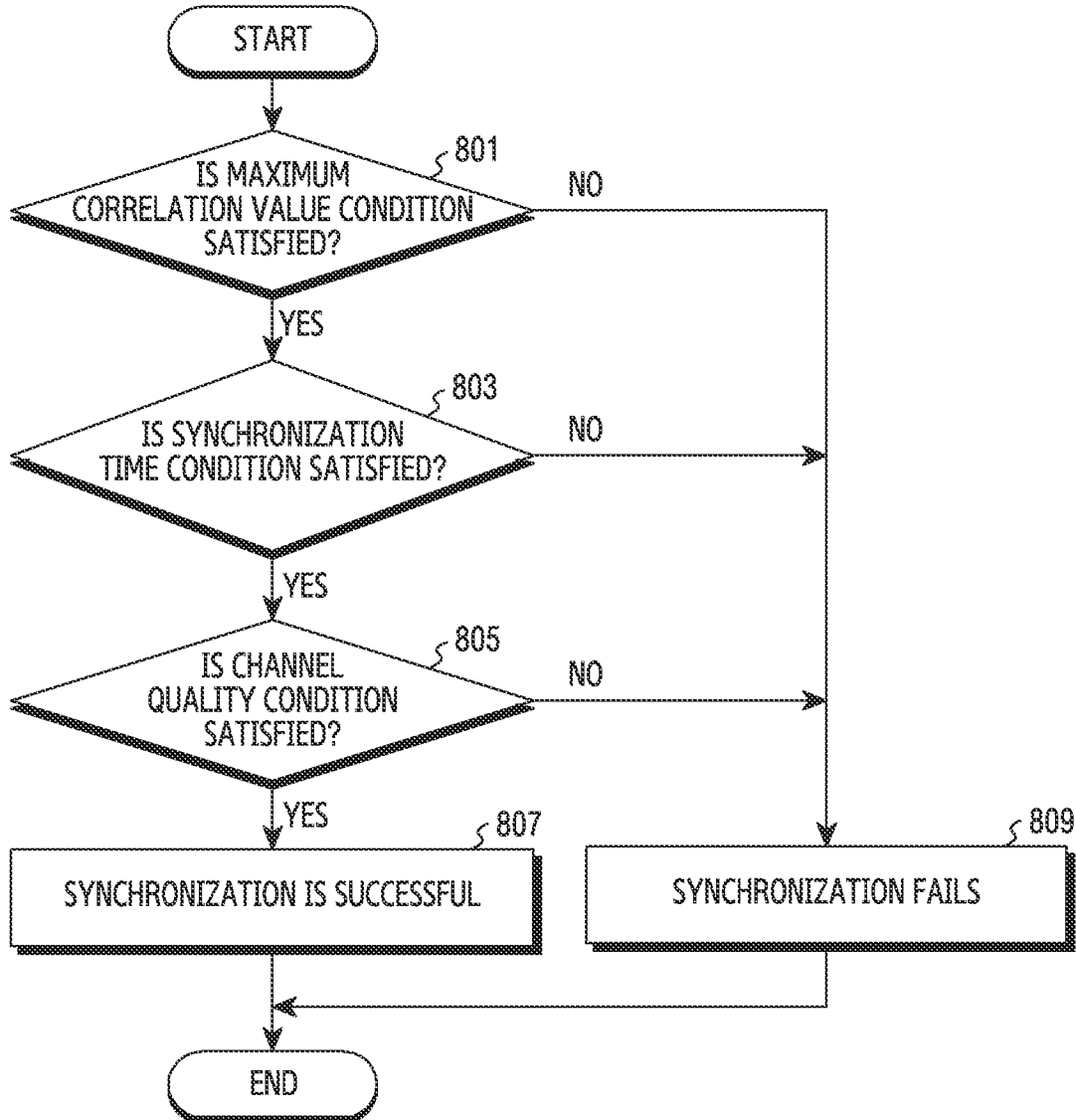
FIG. 8A illustrates a flowchart of a terminal for determining the success or failure of synchronization for each carrier according to an embodiment of the disclosure.

FIG. 8A illustrates a flowchart of a terminal for determining the success or failure of synchronization for each carrier according to an embodiment of the disclosure. The terminal may be the terminal 120 in FIG. 1. Hereinafter, the procedure for determining the success or failure of synchronization for each carrier in FIG. 8A may be performed according to operation 701 in FIG. 7.

Referring to FIG. 8A, in operation 801, the terminal may determine whether or not a maximum correlation value condition for the carrier is satisfied. The maximum correlation value condition means a condition for detecting the success of synchronization of a carrier based on the maximum correlation value for a synchronization sequence.

Since the terminal does not know the time at which a synchronization signal is received, the terminal may perform a correlation operation every unit time. The synchronization signal may include a sequence. For example, the synchronization signal may include a PSS sequence. As another example, the synchronization signal may include an SSS sequence. The terminal may perform a correlation operation based on a sequence for a synchronization signal (hereinafter, referred to as a "synchronization sequence"). The terminal may calculate a plurality of correlation values through the correlation operation using the synchronization sequence. The terminal may determine a maximum correlation value, which is a peak among a plurality of correlation values. The terminal may calculate the maximum correlation value exceeding a correlation threshold value through the correlation operation in the unit time at which the synchronization sequence is transmitted. This is due to the fact that the correlation operation is performed between the same synchronization sequence so that a peak is derived from the correlation value. The terminal may determine, as a synchronization time, the unit time having the maximum correlation value through the correlation operation. Meanwhile, if the synchronization fails, although the maximum correlation value is the largest one of the calculated correlation values, the maximum correlation value may be equal to or less than the correlation threshold value. The terminal may determine whether or not the synchronization fails by comparing the maximum correlation value with the correlation threshold value. For example, the terminal may determine whether or not the maximum correlation value satisfies the following equation.

$$Corr_{max,m} > C_t \qquad \text{Equation 1}$$

In Equation 1, "m" represents the index indicating a carrier. $Corr_{max,m}$ may be the maximum correlation value of the carrier with index m. $C_t$ may be a correlation threshold value.

The terminal may determine the success or failure of synchronization of a carrier based on whether or not the case where the maximum correlation value for the carrier does not exceed the correlation threshold value is continuously detected more than a threshold number of times. The threshold number of times may be preset to a fixed value (e.g., twice), or may be set to be variable depending on the channel state or the user input. The terminal may determine whether or not the maximum correlation value condition is satisfied according to whether or not the case where the maximum correlation value for the carrier does not exceed the correlation threshold value is continuously detected a threshold number of times or more.

The terminal may determine that the maximum correlation value condition is satisfied if the number of times that the maximum correlation value does not exceed the correlation threshold value successively is equal to or greater than a threshold number. The terminal may perform operation 803. The terminal may determine that the maximum correlation value condition is not satisfied if the number of times that the maximum correlation value does not exceed the correlation threshold value successively is less than the threshold number. According to an embodiment, if the threshold number is 1, the terminal may determine that the maximum correlation value condition is not satisfied in response to the detection indicating that the maximum correlation value does not exceed the correlation threshold value. The terminal may perform operation 809.

In operation 803, the terminal may determine whether or not a synchronization time condition for the carrier is satisfied. The synchronization time condition means a condition for detecting the success of synchronization of a carrier based on the obtained synchronization of the carrier (i.e., cell time). The terminal may determine the cell time of the carrier as the synchronization of the carrier. The terminal may determine whether or not the cell time is within a predetermined range. The cell time may be determined using the cell time offset (CTO) from a reference value. The terminal may determine whether or not the synchronization time condition is satisfied depending on whether or not the cell time offset of the corresponding carrier is within a specific range. For example, the terminal may determine whether or not the cell time offset of the first carrier satisfies the following equation.

$$t_{s_1} < T_{CTO,m} < t_{s_2} \qquad \text{Equation 2}$$

In Equation 2, "m" represents the index indicating a carrier. $T_{CTO,m}$ represents the cell time offset of the first carrier, and $t_{s1}$ and $t_{s2}$ represent the upper limit value and the lower limit value, respectively, of a specific range for the synchronization time condition.

The terminal may determine that the synchronization time condition is satisfied if the cell time offset is within a certain range. The terminal may perform operation 805. The terminal may determine that the synchronization time condition is not satisfied if the cell time offset is out of a specific range. This is due to the fact that the reliability of the synchronization of the corresponding carrier is lowered if the synchronization obtained periodically (for example, at a period of 5 ms) is out of a certain range. The terminal may perform operation 809.

In operation 805, the terminal may determine whether or not the channel quality condition for the carrier is satisfied. The channel quality condition means a condition for detecting the success of synchronization of the carrier based on the obtained channel quality of the carrier. The terminal may determine whether or not the channel quality for the carrier is higher than a predetermined reference (e.g., a reference value). For example, the terminal may determine whether or not the BLER of the physical downlink shared channel (PDSCH) satisfies the following equation.

$$BLER_m < R_{BLER} \qquad \text{Equation 3}$$

In Equation 3, "m" represents the index indicating a carrier. $BLER_m$ represents the BLER of the PDSCH for the carrier of index m. $R_{BLER}$ represents a quality threshold value. The terminal may determine that the channel quality condition is satisfied if the BLER of the PDSCH is less than a threshold value.

The terminal may determine that the channel quality condition is satisfied if the channel quality is higher than a predetermined reference. The terminal may perform operation 807. On the other hand, if the channel quality condition is lower than the predetermined reference, the terminal may perform operation 809.

In operation 807, the terminal may determine the success of synchronization of the carrier. In operation 809, the terminal may determine the failure of synchronization of the carrier. According to various embodiments, the terminal may perform operations 801 to 809 for the respective carriers set for the CA of the terminal. The terminal may separately determine the success or failure of synchronization for each carrier.

A method for determining the success or failure of synchronization of each carrier has been described with reference to FIG. 8A. However, the serial connection of the three conditions shown in FIG. 8A is only an example for determining the success or failure of synchronization, and the disclosure is not limited thereto. In other words, the terminal may determine the success or failure of synchronization of the carrier in various manners such as determining the success or failure of synchronization of the carrier with a different sequence of the three conditions, determining the success or failure of synchronization of the carrier with some conditions, or determining the success or failure of synchronization of the carrier by adding other conditions, which are not illustrated, to the above conditions. For example, if the synchronization time condition of the carrier is satisfied, the terminal may determine that the synchronization of the carrier is successful without determining other conditions. As another example, if the synchronization time condition of the carrier is satisfied, and if the BLER of the PDSCH of the carrier is less than a threshold value, the terminal may determine that the synchronization of the carrier is successful without determining the maximum correlation value condition.

The terminal determines the success or failure of synchronization of each carrier, thereby obtaining the synchronization of the carrier that is in synchronization. The terminal may perform synchronization compensation before determining that a specific carrier is out of synchronization (hereinafter, referred to as "early synchronization compensation"). The early synchronization compensation is performed prior to the synchronization compensation performed after determining the success or failure of synchronization of each carrier, thereby reducing the compensation burden of the synchronization compensation and providing quick synchronization recovery. That is, the terminal may perform synchronization compensation prior to the synchronization compensation in operation 707 in FIG. 7. Hereinafter, an example of early synchronization compensation will be described with reference to FIG. 8B.

Figure 8B:
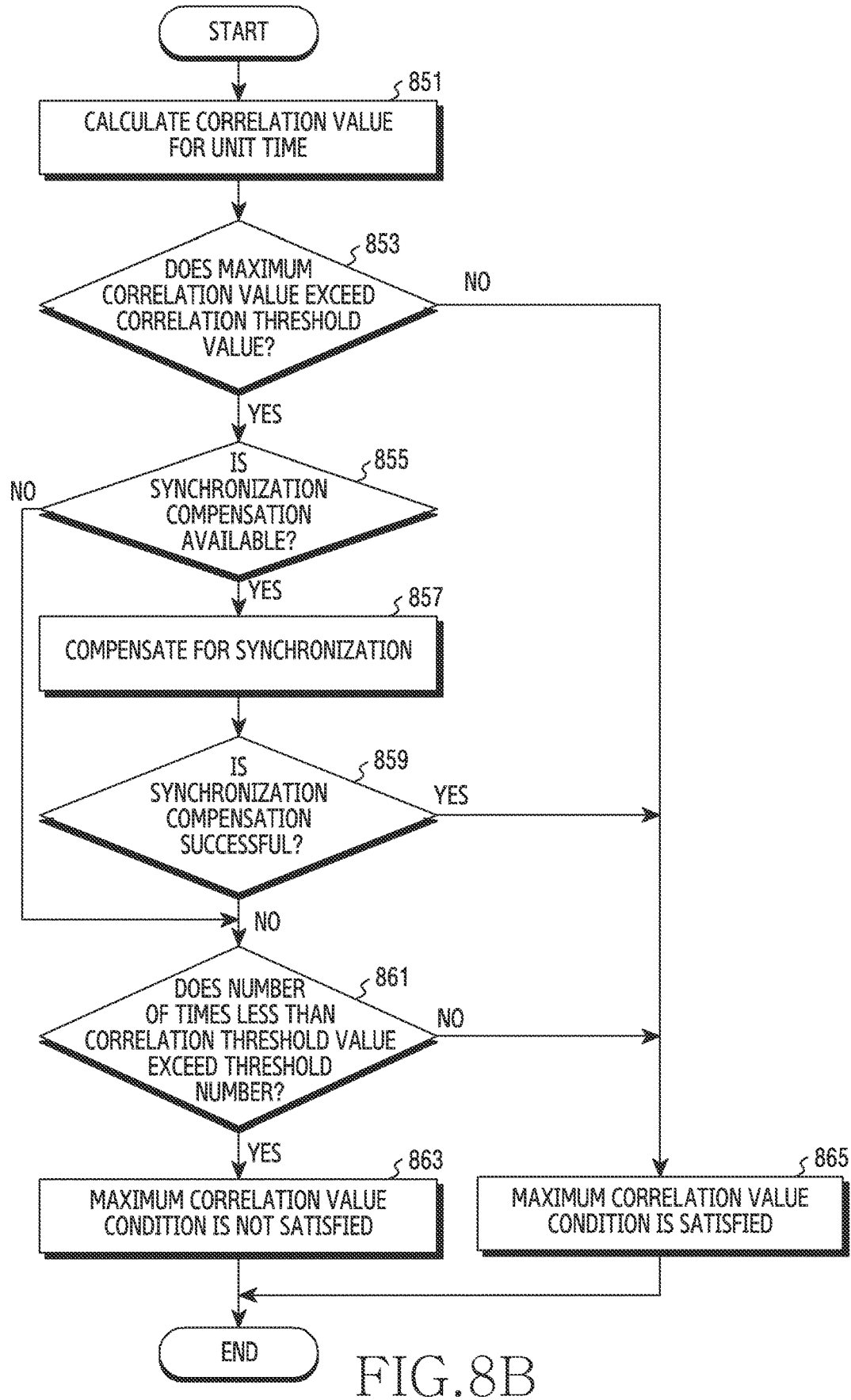
FIG. 8B illustrates a flowchart of a terminal for early synchronization compensation according to an embodiment of the disclosure.

FIG. 8B illustrates a flowchart of a terminal for early synchronization compensation according to an embodiment of the disclosure. The terminal may be the terminal 120 in FIG. 1. The terminal performs operation 801 of the procedure for determining the success or failure of synchronization of each carrier shown in FIG. 8A.

Referring to FIG. 8B, the terminal may calculate a correlation value per unit time in operation 851. The terminal may calculate a correlation value for every unit time using a synchronization sequence.

In operation 853, the terminal may determine whether or not the maximum correlation value exceeds a correlation threshold value. The terminal may identify the correlation value (i.e., the maximum correlation value) at which a peak occurs. The terminal may determine whether or not the identified maximum correlation value exceeds a correlation threshold value. The correlation threshold value may be a threshold value for identifying a peak that occurs using a correlation operation of the same or similar synchronization sequence. That is, if the maximum correlation value exceeds a correlation threshold value, the terminal may determine that the synchronization for the carrier transmitting the corresponding synchronization sequence is successful. The terminal may perform operation 865. On the other hand, if the maximum correlation value is equal to or less than the correlation threshold value, the terminal may perform operation 855.

In operation 855, the terminal may determine whether or not the synchronization compensation is available. The terminal may determine whether or not there is a carrier for synchronization compensation. This is due to the fact that there is no input to perform synchronization compensation if there is no carrier that is in synchronization. Thus, the terminal may determine whether or not there is a carrier that is in synchronization. For example, the terminal may determine the carriers whose maximum correlation value is equal to or more than the correlation threshold value as a carrier in synchronization. The terminal may identify the indexes of the carriers satisfying Equation 1, among a plurality of carriers set for the terminal.

The maximum correlation value condition has been illustrated and described as an example of a condition for determining the success or failure of synchronization of each carrier in order to determine whether or not the synchronization compensation is available. However, the terminal may also identify the carrier that is in synchronization using other conditions (e.g., the synchronization time condition in FIG. 8A). If the synchronization compensation is unavailable, the terminal may perform operation 865. If the synchronization compensation is available, the terminal may perform operation 857.

In operation 857, the terminal may perform synchronization compensation. The terminal may perform early synchronization compensation. The early synchronization compensation, which is the same as or similar to the synchronization compensation in operation 707 in FIG. 7, means a procedure for obtaining the synchronization of a carrier out of synchronization based on the synchronization of the carrier that is in synchronization.

The terminal may determine a compensation value (e.g., $\Delta t_m$, where "m" is the index of a carrier out of synchronization) based on the synchronization of at least one of the carriers that are in synchronization, which are identified in operation 855. The compensation value means a value for compensating for a carrier that is out of synchronization. For example, the compensation value may be determined based on an average of synchronization of one or more carriers in synchronization. As another example, the compensation value may be determined based on the synchronization of one of one or more carriers in synchronization. The terminal may apply the compensation value to the cell time of the carrier out of synchronization. For example, if the cell time offset of the previous frame of the carrier out of synchronization is $t_{offset}$, the terminal may determine the cell time offset in the current frame to be $t_{offset} + \Delta t_m$.

In operation 859, the terminal may determine whether or not the synchronization compensation is successful. The terminal may determine whether or not the synchronization-compensated cell time offset is within a specific range. For example, the terminal may determine whether or not the synchronization-compensated cell time offset satisfies the following equation.

$$t_{e_1} < t_{offset} + \Delta t_m < t_{e_2} \qquad \text{Equation 4}$$

In Equation 4, $t_{offset}$ represents a cell time offset in the previous frame, and $\Delta t_m$ represents a compensation value for a carrier of an index m. $t_{s1}$ and $t_{s2}$ represent the upper limit value and the lower limit value, respectively, of a range for early synchronization compensation.

Although the synchronization time condition has been illustrated and described as an example of a condition for determining the success or failure of the synchronization compensation, it is available to identify the carrier that is in synchronization using other conditions (e.g., the channel quality condition in FIG. 8A). The terminal may perform operation 865 if the synchronization compensation is successful. The terminal may perform operation 861 if the synchronization compensation fails.

In operation 861, the terminal may determine whether or not the number of times the maximum correlation value is less than the correlation threshold value exceeds a threshold number. Operation 861 corresponds to operation 801 in FIG. 8A, and thus a description of the same or similar operations will be omitted. The terminal may perform operation 863 if the number of times the maximum correlation value is less than the correlation threshold value exceeds the threshold number. On the other hand, if the number of times the maximum correlation value is less than the correlation threshold value is equal to or less than the threshold number, the terminal may perform operation 865.

In operation 863, the terminal may determine that the maximum correlation value condition is not satisfied. The terminal may determine that the carrier has failed in synchronization. In operation 865, the terminal may determine that the maximum correlation value condition is satisfied. The terminal may determine that the synchronization of the corresponding carrier is successful, or may determine the success or failure of synchronization of the carrier by further determining whether or not other conditions are satisfied.

Although an example of performing early synchronization compensation while determining whether or not the maximum correlation value condition is satisfied has been described in FIG. 8B, the early synchronization compensation of the disclosure may be performed even during the determination of other conditions. For example, the terminal may perform early synchronization compensation when determining whether or not the synchronization time condition is satisfied according to operation 803 in FIG. 8A. In addition, according to an embodiment, the terminal may perform the early synchronization compensation multiple times, instead of performing the same once, under particular conditions.

An example of determining the success or failure of synchronization of each carrier has been described with reference to FIGS. 8A and 8B. Hereinafter, operations and embodiments of a terminal for compensating for synchronization of a carrier, which is out of synchronization, will be described with reference to FIGS. 9 to 11B.

Figure 9:
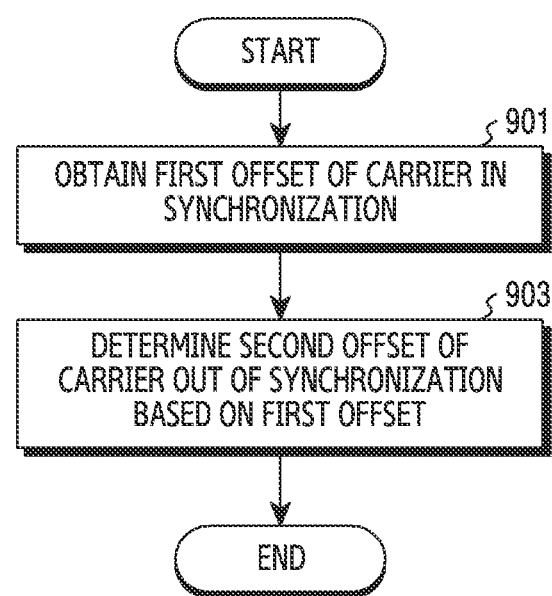
FIG. 9 illustrates a flowchart of a terminal for synchronization compensation according to an embodiment of the disclosure.

FIG. 9 illustrates a flowchart of a terminal for synchronization compensation according to an embodiment of the disclosure. The terminal may be the terminal 120 in FIG. 1. FIG. 9 illustrates operation 707 in FIG. 7.

Referring to FIG. 9, the terminal may obtain a first offset of a carrier that is in synchronization in operation 901. The offset, which is a cell time offset, is a value indicating how much the cell timer for the corresponding carrier is shifted from a reference timer (e.g., FRC). The respective carriers set for the terminal may share a reference timer. The reference timer provides a reference value, which is commonly applied to the respective carriers. The value of the cell timer for each carrier may indicate the actual cell time through an offset from the reference value. The first offset may be the offset for the cell time of the first carrier, which is at least one compensation carrier, among one or more carriers that are in synchronization.

According to various embodiments, the carrier of the first offset may be a carrier using the same beam direction as that of the carrier that is out of synchronization. The terminal may identify, as the first offset, the offset of the carrier that is in synchronization, which uses the same beam as that of the carrier that is out of synchronization.

According to various embodiments, the carrier of the first offset may be within a predetermined range of the carrier that is out of synchronization in the frequency band. That is, the carrier of the first offset may be adjacent to the carrier that is out of synchronization in the frequency band. The influence of the frequency selectivity may be reduced by compensating for the synchronization of the carrier that is out of synchronization using the synchronization of the adjacent carrier in the frequency band.

According to various embodiments, the carrier of the first offset may be a carrier with high (excellent) channel quality, among the carriers that are in synchronization. For example, the carrier of the first offset may be the carrier having the smallest change in the variation value of the cell timing, among the carriers that are in synchronization. In addition, the carrier of the first offset may be, for example, the carrier with the highest RSRQ, among the carriers that are in synchronization. It is available to perform synchronization compensation with high reliability by compensating for the synchronization of the carrier that is out of synchronization using the synchronization of the carrier with high channel quality.

In operation 903, the terminal may determine a second offset of the carrier that is out of synchronization based on the first offset. According to various embodiments, the terminal may determine a second offset of the carrier that is out of synchronization using the first offset. For example, the terminal may apply the value of the first offset to the second offset of the carrier that is out of synchronization. That is, the second offset may be equal to the first offset. As another example, the terminal may determine the second offset by adding the compensation value between the carrier of the first offset and the carrier of the second offset to the first offset.

According to various embodiments, the terminal may use the offset values of the compensation carriers, including the first offset, thereby determining the offset of the second carrier that is out of synchronization. In some embodiments, the terminal may determine the second offset using an average of the offset values. In some other embodiments, the terminal may apply respective weights to the offset values, thereby determining the second offset. For example, the terminal may apply the weights differently depending on how close the respective compensation carriers are to the carrier that is out of synchronization in the frequency domain, thereby determining the second offset. As another example, the terminal may apply the weights differently depending on the channel quality of each of the compensation carriers, thereby determining the second offset. As another example, the terminal may apply the weights differently depending on the geographical proximity of the respective compensation carriers to the cell providing the carrier that is out of synchronization, thereby determining the second offset. The geographical proximity may be determined based on at least one of TA, beam information, geographical information such as that from a global positioning system (GPS), a cell identifier (ID), and statistical information.

Figure 10:
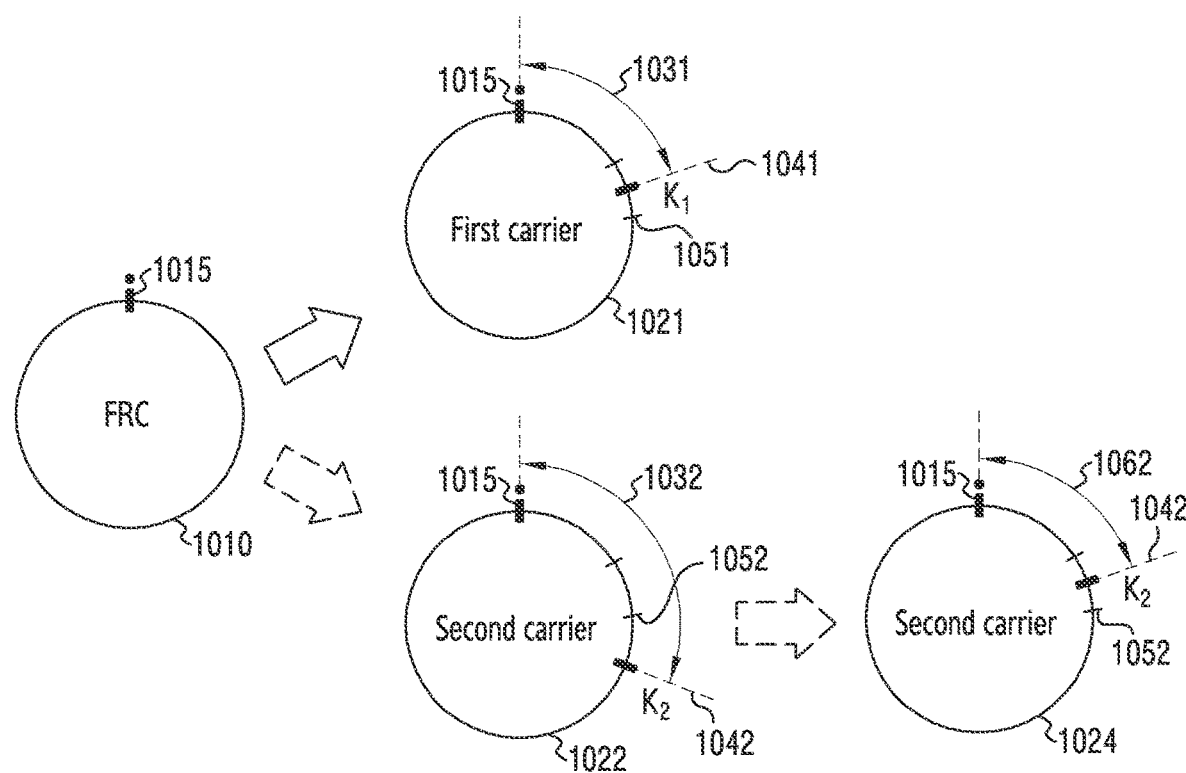
FIG. 10 illustrates an example of a timer of a terminal for synchronization compensation according to an embodiment of the disclosure.

FIG. 10 illustrates an example of a timer of a terminal for synchronization compensation according to an embodiment of the disclosure. The terminal may be the terminal 120 in FIG. 1.

Referring to FIG. 10, the terminal may include a reference timer 1010. The reference timer 1010 is intended to provide a common reference to the respective carriers for the terminal, and the respective cell timers may be configured to refer to the value of the reference timer 1010. FIG. 10 illustrates an FRC as a reference timer. That is, the FRC may be configured to provide a common reference value to the carriers for the terminal. The terminal may drive the FRC whenever it is turned on. The terminal may determine the synchronization time of the base station based on the FRC. The terminal may continuously increase the FRC value according to the number of samples. In general, the FRC may be configured in the form of at least one of "number of frames", "number of subframes", "number of slots", or "number of samples".

The value indicated by the indicator 1015 may be an FRC value. The indicator 1015 of the FRC circulates in a specified period until the terminal is turned off. In some embodiments, the specified period may be 10 milliseconds (ms).

The terminal may repeatedly circulate the indicator 1015 every 10 ms. The indicator 1015 may repeatedly indicate an FRC value in a specified period.

The terminal may include a cell timer. The terminal may include cell timers for carriers configurable for the terminal. For example, the terminal may include a first cell timer 1021 for the first carrier and a second cell timer 1022 for the second carrier. The first cell timer 1021 may include a first cell time indicator 1041. The first cell time indicator 1041 may indicate the cell time $K_1$ of the first cell for the first carrier. The second cell timer 1022 may include a second cell time indicator 1042. The second cell time indicator 1042 may indicate the cell time $K_2$ of the second cell for the second carrier. The cell timer may repeatedly indicate the cell time every specified period. The specified period may be set to be equal to the specified period of the FRC. In other words, the cell timer may have a value of the same period as that of the FRC, with only a starting point different therefrom.

A CTO may be defined as a value relative to the FRC calculated through the synchronization signal search of the base station. The first cell time indicator 1041 may indicate the state shifted by a first CTO 1031 from the value of the FRC. That is, the first cell time indicator 1041 may indicate the position shifted by the first CTO 1031 from the indicator 1015. The second cell time indicator 1042 may indicate the state shifted by a second CTO 1032 from the value of the FRC. That is, the second cell time indicator 1042 may indicate the position shifted by the second CTO 1032 from the indicator 1015. The terminal may determine the actual synchronization time based on the FRC value and the CTO value. The value obtained by adding the CTO value of the cell to the FRC value may mean the actual synchronization time of the corresponding cell.

A synchronization time condition may be used to determine the success or failure of synchronization of the cell. That is, the terminal may determine the success or failure of synchronization of the cell according to whether or not the cell time of the cell is within the expected synchronization range {i.e., an effective range (e.g., Equation 2)}.

The effective range for the first carrier may be a first effective range 1051. The terminal may obtain the synchronization of the first carrier from the synchronization signal of the first cell. The terminal may determine the cell time of the first carrier based on the first CTO 1031. The terminal may determine the cell time of the first carrier according to the value indicated by the first cell time indicator 1041. Since the cell time $K_1$ indicated by the first cell time indicator 1041 is within the first effective range 1051, the terminal may determine that the synchronization of the first cell is successful.

The effective range for the second carrier may be a second effective range 1052. The terminal may obtain the synchronization of the second carrier from a synchronization signal of the second cell. The terminal may determine the cell time of the second carrier based on the second CTO 1032. The terminal may determine the cell time of the second carrier according to the value indicated by the second cell time indicator 1042. Since the cell time $K_2$ indicated by the second cell time indicator 1042 is out of the second effective range 1052, the terminal may determine that the synchronization of the second cell has failed.

Since the second carrier has failed in synchronization, the terminal may be required to recover the synchronization of the second carrier. The terminal may determine the synchronization of the second carrier, which is out of synchronization, based on the synchronization of the first carrier, which is in synchronization.

In some embodiments, the first carrier and the second carrier may be transmitted from the same base station to the terminal, and the terminal may be served through the first carrier and the second carrier using the same beam. Therefore, the synchronization of the first carrier and the synchronization of the second carrier may be set to be equal or similar within a predetermined error range.

If the second carrier is out of synchronization, the terminal may determine the synchronization of the first carrier as the synchronization of the second carrier. More specifically, the terminal may determine the first CTO 1031 as a compensation CTO 1062. The terminal may compensate for the synchronization of the second carrier according to the FRC value and the compensation CTO value. The terminal may move the second cell time indicator 1042 so as to point to the position shifted by the compensation CTO 1062 from the indicator 1015. The terminal may determine that the synchronization of the second carrier has been recovered as the cell time $K_2$ indicated by the second cell time indicator 1024 is within the second effective range 1052. The terminal may determine that the synchronization of the second carrier is successful.

According to various embodiments, the terminal may include an FRC as shown in FIG. 10. In some embodiments, the terminal may include separate hardware in which the FRC is implemented. The respective cell timers in the terminal may be operatively connected to the FRC. As the FRC is implemented as independent hardware, it is available to reduce an error due to external influences and to provide accurate synchronization. In some other embodiments, the terminal may include a memory in which the FRC is implemented as software. The respective cell timers in the terminal may be implemented so as to refer to the memory.

The terminal may include a single FRC, and each cell timer may perform synchronization by referring to the single FRC. As the FRC is shared by the respective cell timers, the value of the FRC may be used as a reference for obtaining the synchronization of each cell timer. Meanwhile, the disclosure does not exclude a configuration in which the terminal includes a plurality of FRCs, as well as a single FRC. Each cell timer may be implemented so as to refer to some of a plurality of FRCs. Even if a plurality of FRCs are implemented, it may be required that the same FRC value be provided to the respective cell timers in order to provide a reference value.

Figure 11A:
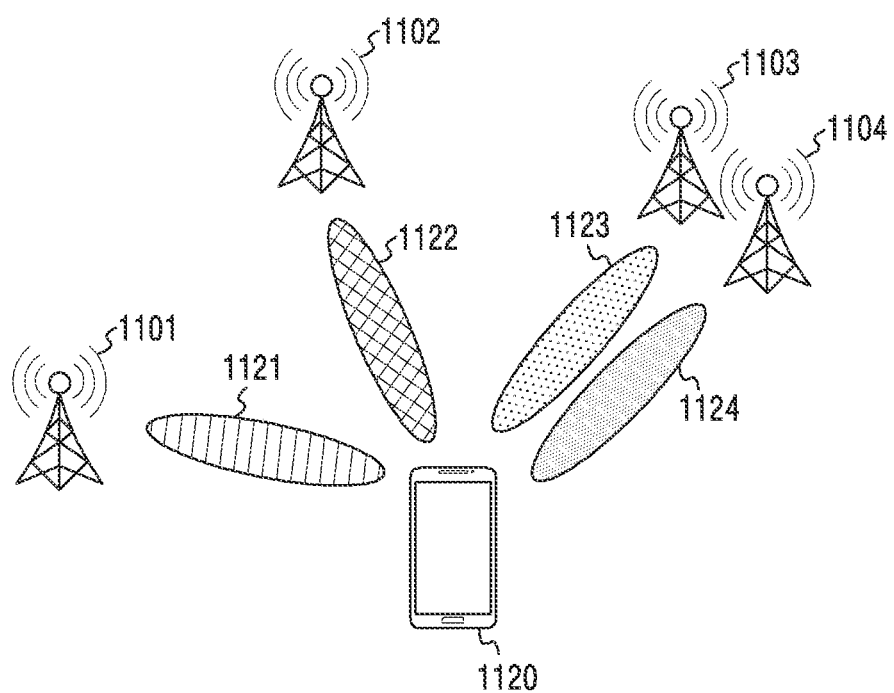
FIG. 11A illustrates an example of synchronization compensation based on cell-deployment according to an embodiment of the disclosure.

FIG. 11A illustrates an example of synchronization compensation based on cell-deployment according to an embodiment of the disclosure. The cell-deployment may include a physical location where each cell is provided, coverage, the frequency band of the cell, and so on. In addition, the cell-deployment may include base station deployment.

Referring to FIG. 11A, a terminal 1120 may be served by a first base station 1101 through a first carrier 1121. The terminal 1120 may be served by a second base station 1102 through a second carrier 1122. The terminal 1120 may be served by a third base station 1103 through a third carrier 1123. The terminal 1120 may be serviced by a fourth base station 1104 through a fourth carrier 1124. The terminal 120 may perform the CA including four carriers. Hereinafter, an example in which the first base station 1101, the second base station 1102, and the third base station 1103 are spaced a long distance apart from each other and the third base station 1103 and the fourth base station 1104 are spatially adjacent to each other will be described.

If the physical locations of the base stations are spaced quite a long distance apart from each other, there may be a difference in the propagation path between the synchronization signals transmitted from the base stations, so that the difference in the synchronization between the carriers of the adjacent frequency bands may increase. If the similarity between the synchronization is not satisfied as described above, it may be difficult to use the respective pieces of synchronization mutually for synchronization compensation. For example, even if the first carrier 1121 is in synchronization and the second carrier 1122 is out of synchronization, the terminal 1120 may not compensate for the synchronization of the second carrier 1122 based on the synchronization of the first carrier 1121.

Meanwhile, if the positions of the respective base stations are the same or adjacent to each other, the propagation paths of the synchronization signals transmitted from the respective base stations may be similar even if the base stations are different. Accordingly, the synchronization between the base stations may be similar. If the similarity between the synchronization is satisfied, the respective pieces of synchronization may be used mutually for synchronization compensation. For example, if the third carrier 1123 is in synchronization and the fourth carrier 1124 is out of synchronization, the terminal 1120 may compensate for the synchronization of the fourth carrier 1124 based on the synchronization of the third carrier 1123. For example, the terminal may apply the cell time of the third carrier 1123 to the cell time of the fourth carrier 1124. As described above, in order to determine the synchronization of another carrier based on the synchronization of a specific carrier, the terminal is required to consider cell-deployment. Hereinafter, when the similarity between the synchronization is satisfied, it will be expressed that the cells are co-located with each other for the convenience of description.

In some embodiments, the terminal may perform synchronization compensation based on the TA. The terminal may calculate the degree of correspondence of physical location between the terminal and each base station according to a TA value received from the base station. The terminal may use the mutually-obtained synchronization for synchronization compensation in the case of base stations in which the difference between the TA values is less than a threshold range. In addition, a timing advance group (TAG) may be used in a manner similar to the TA. For example, the terminal may perform synchronization compensation for the cells provided from the base station in the same TAG using inter-cell synchronization. That is, the cells provided from the base station in the same TAG are co-located with each other.

In addition, in some embodiments, the terminal may perform synchronization compensation based on statistical information. The base stations located adjacent to each other may have the same statistical characteristics. The statistical characteristics may include propagation delay, Doppler shift, delay spread, frequency of terminal access, and frequency of beam use. The terminal may determine base stations having correlation between statistical characteristics higher than a threshold value to be the same group, and may perform synchronization compensation using the synchronization between the base stations in the same group. That is, the cells provided from the respective base stations in the same group are co-located with each other.

In addition, in some embodiments, the terminal may perform synchronization compensation based on beam information. When receiving a synchronization signal by means of the same terminal beam, the terminal may perform synchronization compensation using the synchronization of the cell associated with the same terminal beam. When receiving a synchronization signal from the beam of the same base station, the terminal may perform synchronization compensation using the synchronization of the cell associated with the beam of the same base station. When receiving a synchronization signal using the same beam pair, the terminal may perform synchronization compensation using the synchronization of the cell associated with the same beam pair. On the other hand, apart from the same beam or the same beam pair, the terminal may manage the beam group according to the directions of the beams, thereby performing synchronization compensation more effectively. The cells provided through respective beams in the beam group are co-located with each other.

The terminal may include a plurality of RF paths in order to perform the CA. The terminal may support the CA over many carriers through a plurality of RF paths. In this case, a used beam and an available band may be determined according to the RF because of hardware constraints. Hereinafter, an example of performing synchronization compensation based on the RF path will be described with reference to FIG. 11B.

Figure 11B:
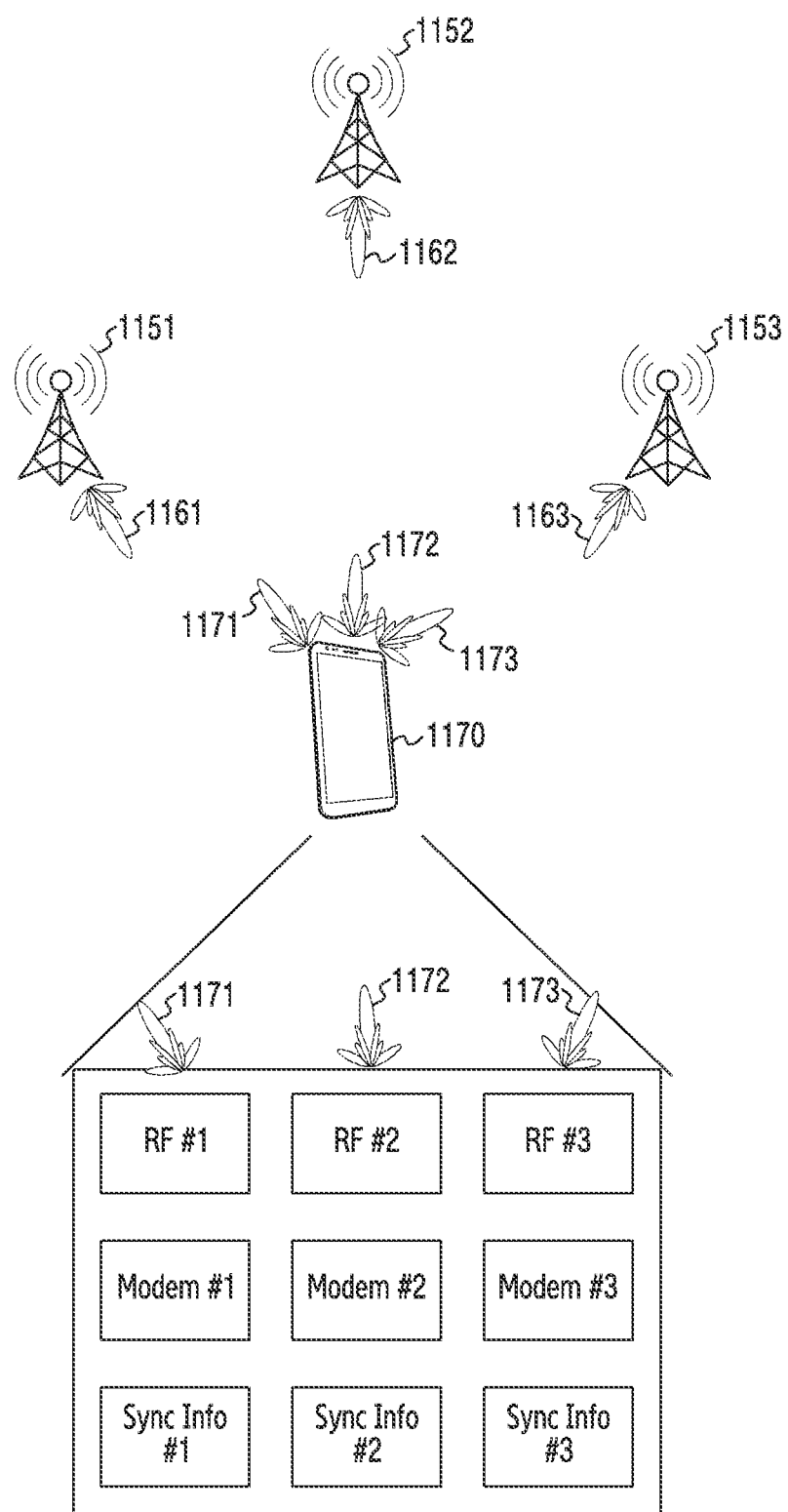
FIG. 11B illustrates an example of synchronization compensation based on an RF path according to an embodiment of the disclosure.

FIG. 11B illustrates an example of synchronization compensation based on the RF path according to an embodiment of the disclosure. Each RF chain may form an independent radio path. The radio path may include an RF module and a modem. The terminal may include a plurality of radio frequency (RF) chains for the CA. The terminal cannot flexibly support all bands for the CA by means of a single RF chain due to the physical constraints of the filter. Thus, each RF chain may be configured to provide at least one specific carrier depending on the configuration of the filter. According to various embodiments, the terminal may utilize information on the beam formed by each RF chain in order to obtain synchronization information for each carrier. Hereinafter, the case where a first RF chain provides a first beam 1171, a second RF chain provides a second beam 1172, and a third RF chain provides a third beam 1173 will be described as an example.

Referring to FIG. 11B, the terminal 1170 may perform communication with a first base station 1151. The first beam 1171 of the terminal may establish a radio link with a first beam 1161 of the first base station 1151. The terminal 1170 may perform communication with a second base station 1152. The second beam 1172 of the terminal may establish a radio link with a second beam 1162 of the second base station 1152. The terminal 1170 may perform communication with a third base station 1153. The third beam 1173 of the terminal may establish a radio link with a third beam 1163 of the third base station 1153. The terminal may communicate with each of three base stations, which are physically separated, via three beams of the terminal. The first beam 1171, the second beam 1172, and the third beam 1173 of the terminal may be beams that are oriented in respective directions. The directions may be spatially separated from each other. As the respective beams are oriented in spatially directions that are spatially separated, the synchronization signals received via the respective beams are received via different RF paths as well.

According to various embodiments, the terminal may perform synchronization compensation between carriers supported by a single RF chain. For example, in the case where the first RF chain can provide the first carrier and the second carrier, if the first carrier is out of synchronization, the terminal may perform synchronization compensation using the synchronization of the second carrier, thereby determining the synchronization of the first carrier.

According to various embodiments, the terminal may not identify the carrier supported through another RF chain as a compensation carrier. That is, if the terminal identifies a compensation carrier, among the carriers that are in synchronization, the terminal may not identify, as a compensation carrier, a carrier provided from the RF chain that is different from the carrier that is out of synchronization.

As described with reference to FIG. 11B, the terminal may identify the compensation carrier for synchronization compensation based on beam information and synchronization information identified according to the physical hardware structure.

Figure 12:
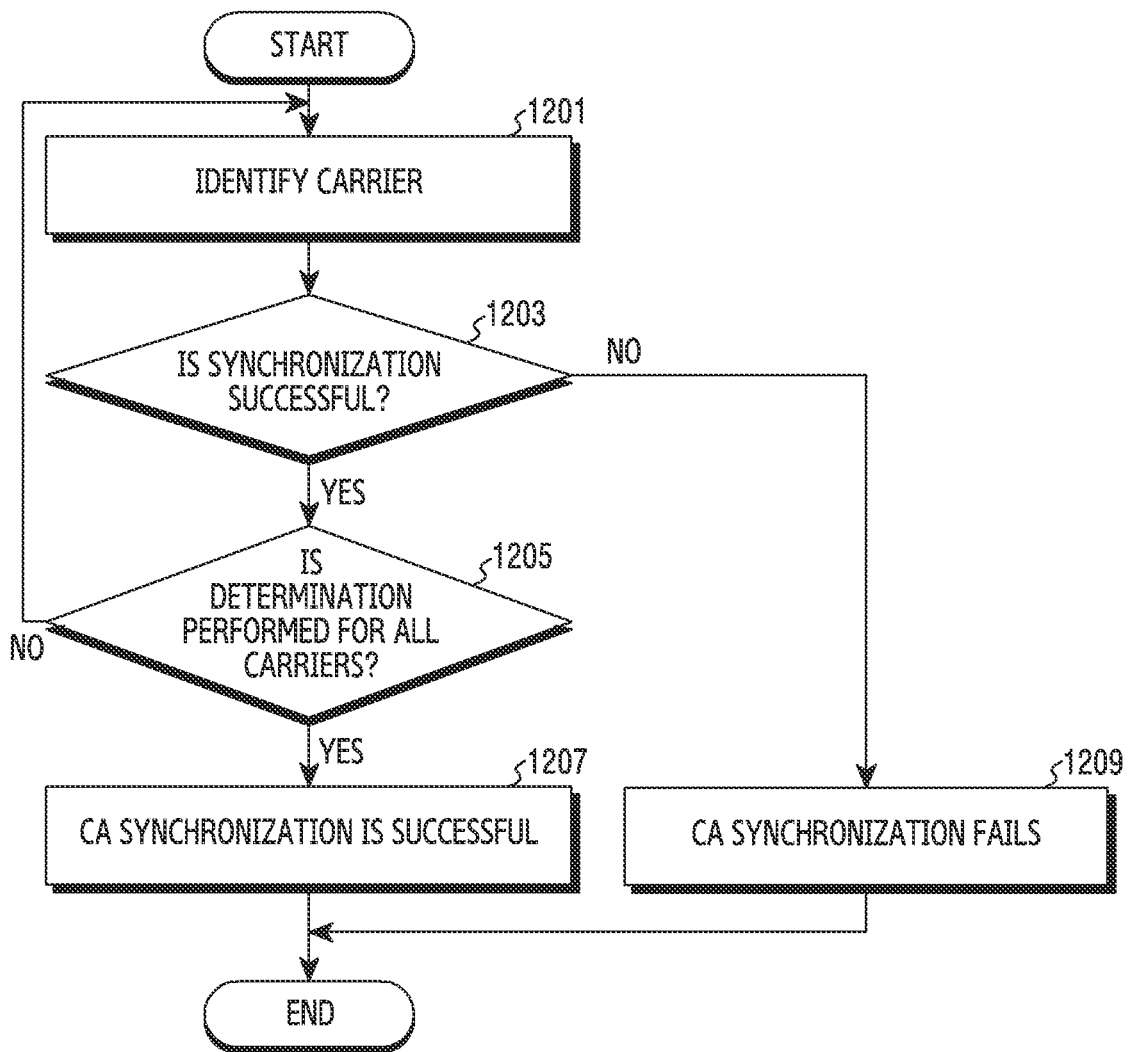
FIG. 12 illustrates a flowchart of a terminal for determining the success or failure of CA synchronization according to an embodiment of the disclosure.

FIG. 12 illustrates a flowchart of a terminal for determining a success or failure of the CA synchronization according to an embodiment of the disclosure. The terminal may be the terminal 120 in FIG. 1.

Referring to FIG. 12, the terminal may identify a carrier in operation 1201. The terminal may identify the carriers set for the CA of the terminal in sequence.

In operation 1203, the terminal may determine the success or failure of synchronization of the carrier identified in operation 1201. The terminal may determine whether or not a channel quality condition for the identified carrier is satisfied. The channel quality condition may be intended to determine the success or failure of synchronization based on the channel quality. The terminal may determine whether or not the channel quality of the carrier is higher than a predetermined reference. If the channel quality is higher than the predetermined reference, the terminal may determine that the condition is satisfied. For example, the terminal may determine whether or not the BLER of the PDSCH of the carrier is a quality threshold value ($R_{BLER2}$). The quality threshold value may be set to be equal to or different from the quality threshold value in operation 805 in FIG. 8A. If the BLER is equal to or greater than the quality threshold value, the terminal may determine that the channel quality condition is satisfied. If the channel quality condition is satisfied, the terminal may perform operation 1205. If the channel quality condition is not satisfied, the terminal may perform operation 1209.

In operation 1205, the terminal may determine whether or not the success or failure of synchronization has been determined for all the carriers. That is, the terminal may determine whether or not the determination of whether or not the channel quality condition is satisfied in operation 1203 has been performed for all of the carriers. This is due to the fact that the terminal can transmit and receive data through the CA without unnecessary decoding or processing delay only if all the carriers are in synchronization. The terminal may determine whether or not the carrier, which has determined the channel quality condition in operation 1203 of the current cycle, is the last of the carriers set for the terminal.

If the success or failure of synchronization has been determined for all the carriers, the terminal may perform operation 1207. If the success or failure of synchronization has not been determined for all the carriers, the terminal may re-perform operation 1201. The terminal may identify the carrier (e.g., the carrier of index m+1) subsequent to the carrier (e.g., the carrier of index m) identified in the previous cycle in operation 1201. The terminal may repeat operations 1201 to 1205 to determine the success or failure of synchronization for all the carriers.

In operation 1207, the terminal may determine that the CA synchronization is successful. The terminal may perform the CA. In operation 1209, the terminal may determine that the CA synchronization has failed. The terminal cannot perform the CA according to the currently configured carriers. The terminal may perform additional procedures to recover the synchronization of the carrier that is out of synchronization. For example, the terminal may perform an RRE procedure to reconnect to the base station.

Although the channel quality condition has been described by way of an example in FIG. 12, the disclosure is not limited thereto. The terminal may also determine the success or failure of the CA synchronization using other conditions or additional conditions. For example, the terminal may determine the success or failure of the CA synchronization based on the synchronization time condition (i.e., whether or not the synchronization of each of the compensated carriers is within a predetermined range).

Figure 13:
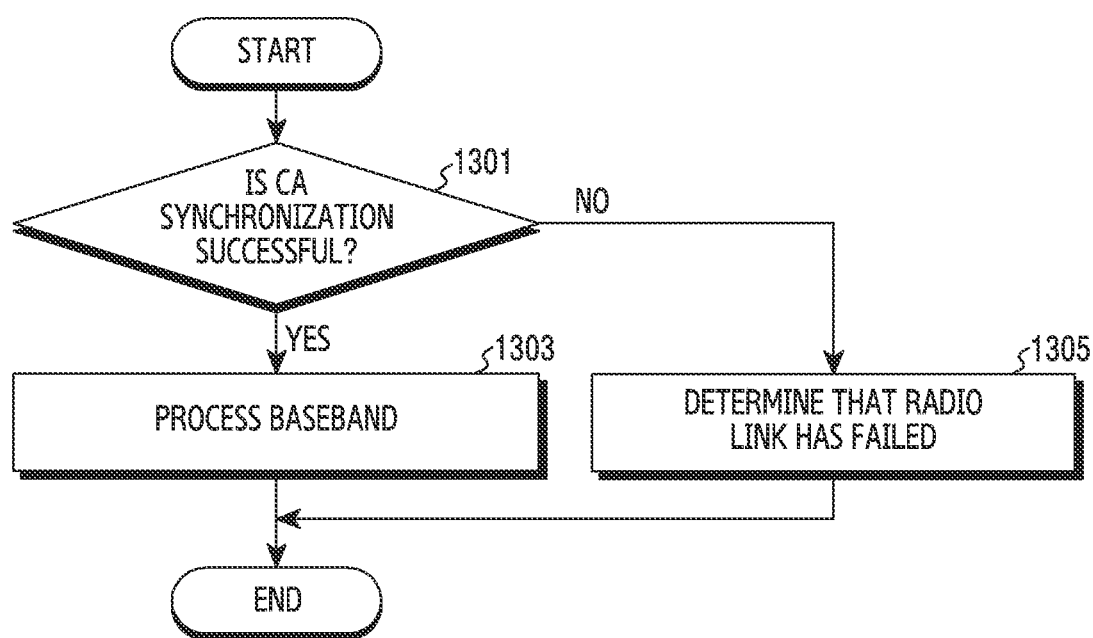
FIG. 13 illustrates a flowchart of a terminal for signal processing according to the success or failure of CA synchronization according to an embodiment of the disclosure.

FIG. 13 illustrates a flowchart of a terminal for signal processing according to the success or failure of CA synchronization according to an embodiment of the disclosure. The terminal may be the terminal 120 in FIG. 1. FIG. 13 illustrates a procedure of the terminal following the procedure in FIG. 7 or 12.

Referring to FIG. 13, the terminal may determine the success or failure of the CA synchronization in operation 1301. The terminal may determine the success or failure of the CA synchronization as shown in FIG. 12. If the CA synchronization is successful, the terminal may perform operation 1303. If the CA synchronization fails, the terminal may perform operation 1305.

In operation 1303, the terminal may process baseband signals. The terminal may process baseband signals received from the respective cells constituting the CA in order to perform the CA. For example, the terminal may decode the Pcell signal and the Scell signal, respectively.

In operation 1305, the terminal may determine radio link failure (RLF). The terminal may declare the RLF, and may search for synchronization of the Pcell again. In addition, the terminal may perform the RRE. That is, the terminal may release all of the settings and resource allocation maintained during the connection, and may re-perform the initial connection procedure and the setting procedure related thereto. The terminal may also reset and reactivate the Scell. Although the disclosure describes a synchronization recovery procedure for compensating for the synchronization of a carrier that is out of synchronization using the synchronization of a carrier that is in synchronization, a reconnection procedure (e.g., RRE) performed by the terminal after determining whether or not the synchronization is recovered by performing the synchronization compensation, as well as the synchronization recovery, may also be understood as an embodiment.

Although FIG. 13 illustrates that the terminal declares the RLF if the CA synchronization fails, the terminal may not immediately declare the RLF. In some embodiments, if the cells that are out of synchronization are Scells, the terminal may determine whether or not to maintain the CA or whether or not to declare the RLF based on the number of Scells that are out of synchronization. In some other embodiments, if the cells that are out of synchronization are Scells, the terminal may add, to the Scells, a carrier that is configured for the CA after excluding the Scells but is not activated for the Scells. The terminal may add the Scell for the CA using the synchronization information obtained during the inter-frequency measurement.

Examples for obtaining and compensating for the synchronization of each of the carriers set for the CA have been described in the disclosure. However, the disclosure is not limited to the CA. All procedures for recovering synchronization of the frequency of a carrier that is out of synchronization, using a synchronization signal transmitted through another carrier frequency may be understood as an embodiment of the disclosure. For example, the terminal may recover synchronization of a specific carrier frequency (e.g., NR cell) using the synchronization of another carrier frequency (e.g., LTE cell) in a dual-connectivity situation.

According to various embodiments, the terminal may perform synchronization compensation of the disclosure when performing inter-frequency measurement. For example, the terminal may perform first measurement for the $f_1$ frequency band and second measurement for the $f_2$ frequency band. It is assumed that both the $f_1$ frequency band and the $f_2$ frequency band are located in the same base station or are located physically adjacent to each other, thereby satisfying the synchronization similarity. In this case, if the synchronization for the first measurement fails, the terminal may determine the synchronization of the first frequency band obtained in the first measurement based on the synchronization of the $f_2$ frequency band obtained in the second measurement. As another example, the terminal may perform synchronization compensation based on the synchronization of each of the neighboring cells obtained through the inter-frequency measurement, even if communication is performed using a single carrier. As another example, the terminal may perform synchronization compensation for the carrier configured and activated for the CA based on the synchronization of a carrier that is configured for the CA but is not activated.

Although the disclosure describes the PSS or SSS in the cellular band as an example of a synchronization signal, all signals for obtaining synchronization may be understood as an embodiment of the disclosure. For example, if the Scell is operating in the unlicensed band for LAA support, a discovery signal may be used to obtain synchronization of the cell.

In the disclosure, although the expression "equal to or more than" or "equal to or less than" has been used in order to determine whether or not a specific condition is satisfied or fulfilled, this is only an example and does not exclude the expression "more than" or "less than". The expression "equal to or more than" can be replaced with "more than", the expression "equal to or less than" can be replaced with "less than", and the expression "equal to or more than and less than" can be replaced with "more than and equal to or less than" in the conditions above.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirt and scope of the disclosure as defined by the appended claims and their equivalents.

What is claimed is:

1. A method of a terminal in a wireless communication system, the method comprising:
    monitoring synchronization of at least one cell;
    detecting an out of synchronization of a second cell;
    identifying at least one first cell which is in synchronization from the at least one cell; and
    obtaining second synchronization information of the second cell based on at least one first synchronization information of the at least one first cell.

2. The method of claim 1, further comprising:
    performing a communication based on the second synchronization information.

3. The method of claim 1, wherein the detecting of the out of synchronization of the second cell comprises:
    determining at least one of:
        whether a maximum correlation value of the second cell according to a synchronization sequence exceeds a correlation threshold value,
        whether a cell time of the second cell is within a predetermined range, or
        whether a channel quality of the second cell is equal to or more than a threshold value.

4. The method of claim 1, wherein the obtaining of the second synchronization information of the second cell comprises:
    identifying at least one cell time offset of the at least one first cell from the at least one first synchronization information; and
    determining a cell time offset of the second cell based on the at least one cell time offset of the at least one first cell.

5. The method of claim 1, wherein the at least one first cell and the second cell are associated with a beam or a beam group.

6. The method of claim 1, wherein the at least one first cell and the second cell are associated a timing advance group (TAG).

7. The method of claim 2,
wherein the performing of the communication comprises changing a synchronization parameter of the second cell from previous second synchronization information to the second synchronization information, and
wherein the previous second synchronization information is used when detecting that the second cell is out of synchronization.

8. The method of claim 2, wherein the performing of the communication based on the second synchronization information comprises:
determining whether the second cell is in synchronization based on the second synchronization information;
performing the communication based on a carrier aggregation (CA) using the at least one first cell and the second cell without at least one of a radio link failure (RLF) or a radio re-establishment (RRE) of the second cell, if the second cell is in synchronization; and
performing the communication using the at least one first cell without the second cell if the second cell is out of synchronization.

9. The method of claim 8, further comprising:
performing the RRE of the second cell, if the second cell is out of synchronization.

10. The method of claim 8, further comprising:
performing a secondary cell (SCell) deletion of the second cell if the second cell is out of synchronization.

11. An apparatus of a terminal in a wireless communication system, comprising:
at least one transceiver; and
at least one processor operatively connected to the at least one transceiver,
wherein the at least one processor is configured to:
monitor synchronization of at least one cell,
detect an out of synchronization of a second cell,
identify at least one first cell which is in synchronization from the at least one cell, and
obtain second synchronization information of the second cell based on at least one first synchronization information of the at least one first cell.

12. The apparatus of claim 11, wherein the at least one processor is further configured to:
perform a communication based on the second synchronization information.

13. The apparatus of claim 11, wherein the at least one processor is further configured to:
determine at least one of:
whether a maximum correlation value of the second cell according to a synchronization sequence exceeds a correlation threshold value,
whether a cell time of the second cell is within a predetermined range, or
whether a channel quality of the second cell is equal to or more than a threshold value.

14. The apparatus of claim 11, wherein the at least one processor is further configured to:
identify at least one cell time offset of the at least one first cell from the at least one first synchronization information; and
determine a cell time offset of the second cell based on the at least one cell time offset of the at least one first cell.

15. The apparatus of claim 11, wherein the at least one first cell and the second cell are associated with a beam or a beam group.

16. The apparatus of claim 11, wherein the at least one first cell and the second cell are associated a timing advance group (TAG).

17. The apparatus of claim 12,
wherein the at least one processor is further configured to change a synchronization parameter of the second cell from previous second synchronization information to the second synchronization information, and
wherein the previous second synchronization information is used when detecting that the second cell is out of synchronization.

18. The apparatus of claim 12, wherein the at least one processor is further configured to:
determine whether the second cell is in synchronization based on the second synchronization information; and
perform the communication based on a carrier aggregation (CA) using the at least one first cell and the second cell without at least one of a radio link failure (RLF) or a radio re-establishment (RRE) of the second cell, if the second cell is in synchronization, and
perform the communication using the at least one first cell without the second cell if the second cell is out of synchronization.

19. The apparatus of claim 18, wherein the at least one processor is further configured to:
perform the RRE of the second cell, if the second cell is out of synchronization.

20. The apparatus of claim 18, wherein the at least one processor is further configured to:
perform a secondary cell (SCell) deletion of the second cell if the second cell is out of synchronization.

* * * * *